United States Patent

Ono et al.

[11] 4,368,251
[45] Jan. 11, 1983

[54] COLOR DIFFUSION TRANSFER PHOTOGRAPHIC LIGHT-SENSITIVE SHEET

[75] Inventors: Shigetoshi Ono; Shinsaku Fujita, both of Kanagawa, Japan

[73] Assignee: Fuji Photo Film Co., Ltd., Kanagawa, Japan

[21] Appl. No.: 140,933

[22] Filed: Apr. 16, 1980

[30] Foreign Application Priority Data

Apr. 17, 1979 [JP] Japan .................................. 54-46948

[51] Int. Cl.³ ........................... G03C 1/40; G03C 1/10
[52] U.S. Cl. .................................... 430/223; 430/225; 430/226; 430/562
[58] Field of Search ................ 430/223, 225, 226, 562

[56] References Cited

U.S. PATENT DOCUMENTS

| | | | |
|---|---|---|---|
| 4,076,529 | 2/1978 | Fleckenstein et al. | 430/223 |
| 4,152,153 | 5/1979 | Fleckenstein et al. | 430/223 |
| 4,245,028 | 1/1981 | Fujita et al. | 430/562 |
| 4,255,509 | 3/1981 | Ono et al. | 430/223 |

*Primary Examiner*—John E. Kittle
*Assistant Examiner*—John L. Goodrow
*Attorney, Agent, or Firm*—Sughrue, Mion, Zinn, Macpeak and Seas

[57] ABSTRACT

A photographic light-sensitive sheet containing at least one light-sensitive silver halide emulsion layer, with at least one of said emulsion layers being associated with a compound represented by the following general formula (I) or (II):

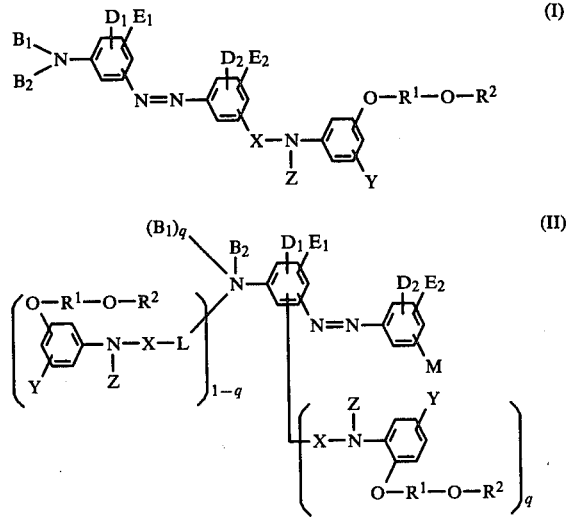

wherein $B_1$ represents a hydrogen atom or an alkyl group, etc.; $B_2$ represents a hydrogen atom, an alkyl group, an acyl group, an alkylsulfonyl group, etc.; $D_1$ and $D_2$ may be the same or different and each represents a hydrogen atom, an alkyl group, an alkoxy group, a halogen atom, etc., provided that $D_2$ does not represent an alkoxy-substituted alkoxy group; $E_1$ and $E_2$ may be the same or different and each represents a hydrogen atom, a cyano group, halogen atom, an alkyl group, an alkoxy group, a sulfonamido group, a carbonamido group, a sulfamoyl group, a carbamoyl group, etc., provided that $E_2$ does not represent an alkoxy-substituted alkoxy group; $R^1$ represents an alkylene group containing two or more carbon atoms; $R^2$ represents an alkyl group, etc.; Z represents a hydrogen atom, an alkyl group, etc.; X represents a divalent linking group and n and p each represents 0 or 1; L represents an alkylene group or an arylene group; M represents a hydrogen atom, an alkyl group, an alkoxy group, a sulfamoyl group, a carbamoyl group, etc.; q represents 1 or 0; and Y represents a diffusibility-controlling moiety.

35 Claims, 4 Drawing Figures

COLOR DIFFUSION TRANSFER PHOTOGRAPHIC LIGHT-SENSITIVE SHEET

BACKGROUND OF THE INVENTION

1. Field of the Invention

This invention relates to a color diffusion transfer photographic light-sensitive sheet. More particularly, it relates to a color diffusion transfer silver halide photographic light-sensitive sheet containing a novel dye-providing compound.

2. Description of the Prior Art

In diffusion transfer photography, compounds wherein a dye compound moiety is bound to a diffusibility-controlling moiety are used as dye-providing compounds. The diffusibility-controlling moiety is a moiety which changes the diffusibility of the dye-providing compound as a result of development processing under alkaline conditions. The dye-providing compounds are generally classified into dye-releasing type compounds and dye-immobilizing type compounds according to the function of the diffusibility-controlling moiety. The dye-releasing type dye-providing compounds are originally non-diffusible but as a result of development processing under alkaline conditions, they release a diffusible dye. As the examples of such dye-releasing type dye-providing compounds are dye-releasing redox compounds.

On the other hand, dye-immobilizing type dye-providing compounds are compounds which are originally diffusible (or release a diffusible dye) but which, as a result of development processing, become non-diffusible (or do not release a diffusible dye). Examples of such dye-immobilizing type dye-providing compounds are described in Japanese Patent Application (OPI) Nos. 63618/76 (the term "OPI" as used herein refers to a "published unexamined Japanese patent application") and 35533/78.

Japanese Patent Application (OPI) Nos. 115528/75 and 104343/76, U.S. Pat. Nos. 3,928,312, 3,931,144, 3,932,381, 3,942,987, 3,954,476, 3,993,638, 4,076,529 and 4,152,153 and *Research Disclosure*, Vol. 130, 13024 (published in Feb., 1975) describe color diffusion transfer process for forming color images using dye-releasing redox compounds. The term "dye-releasing redox compounds" refers to compounds wherein a diffusibility-controlling moiety, called a redox mother nucleus, is bound to a dye moiety or a precursor thereof. This redox mother nucleus first immobilizes the redox compound as a function of the ballast group bound thereto but upon oxidation-reduction (redox) reaction under alkaline conditions, the compound cleaves to release a dye moiety-containing compound (dye compound). That is, when a light-sensitive material containing a light-sensitive silver halide emulsion layer associated with this redox compound is imagewise exposed and developed with an alkaline processing solution, this redox compound per se is oxidized in proportion to the amount of developed silver halide and is further cleaved into a compound containing a dye moiety (hereinafter referred to as a dye compound) and a non-diffusible quinone compound. As a result, this dye compound diffuses into an image-receiving layer to provide a transferred image there.

Examples of yellow-dye-releasing redox compounds are described in U.S. Pat. No. 3,928,312, *Research Disclosure*, 130, 13024 (published in Feb., 1975), etc. However, the stability of the transferred images is insufficient (for example, the light resistance is so poor that the color image suffers serious fading in a bright place), and transfer of the dye moiety is inadequate (i.e., the transfer rate is slow).

Japanese Patent Application (OPI) No. 149328/78 describes azopyrazolone yellow dye-providing compounds containing an $—O—R^1—O—R^2$ moiety in the molecule. However, subsequent investigations have shown that the light fastness of the dyes must be improved and when the pH changes, the image hue changes.

*Research Disclosure*, 16475 (published in Dec., 1977) describes improved yellow dye-providing compounds but the hue of the released dye compound undergoes serious changes depending upon pH.

SUMMARY OF THE INVENTION

An object of the present invention is to provide dye-providing compounds capable of providing a stable yellow dye image.

Another object of the present invention is to provide dye-providing compounds containing a dye moiety with good hue.

A further object of the present invention is to provide dye-providing compounds capable of providing a transferred image which does not suffer a change in hue over a wide pH range.

A still further object of the present invention is to provide dye-providing compounds containing a dye moiety having enhanced transferability.

A further object of the invention is to provide a color diffusion transfer light-sensitive sheet containing a dye-releasing type dye-providing compound capable of providing a transferred color image with sufficient color density in the presence of a comparatively small amount of silver halide.

Yet a further object of the invention is to provide so-called "negative type" color diffusion transfer light-sensitive sheet enabling to utilize a light-sensitive element.

Thus the present invention provides a color diffusion transfer photographic light-sensitive sheet containing a dye-releasing type dye-providing compound of the formula (I) or (II) which satisfies the above-described objects:

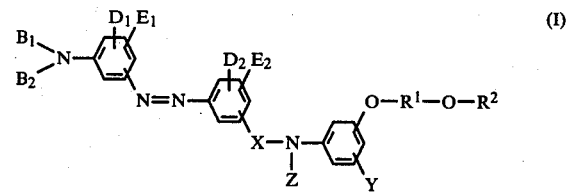

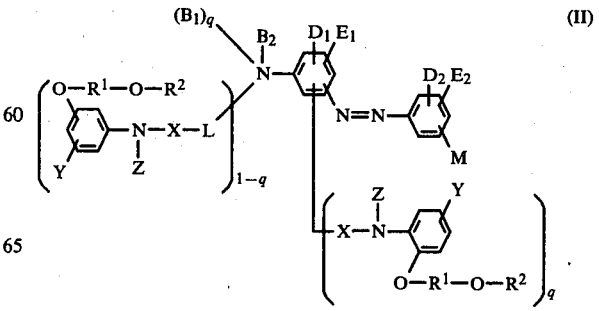

DETAILED DESCRIPTION OF THE INVENTION

Figure 1:
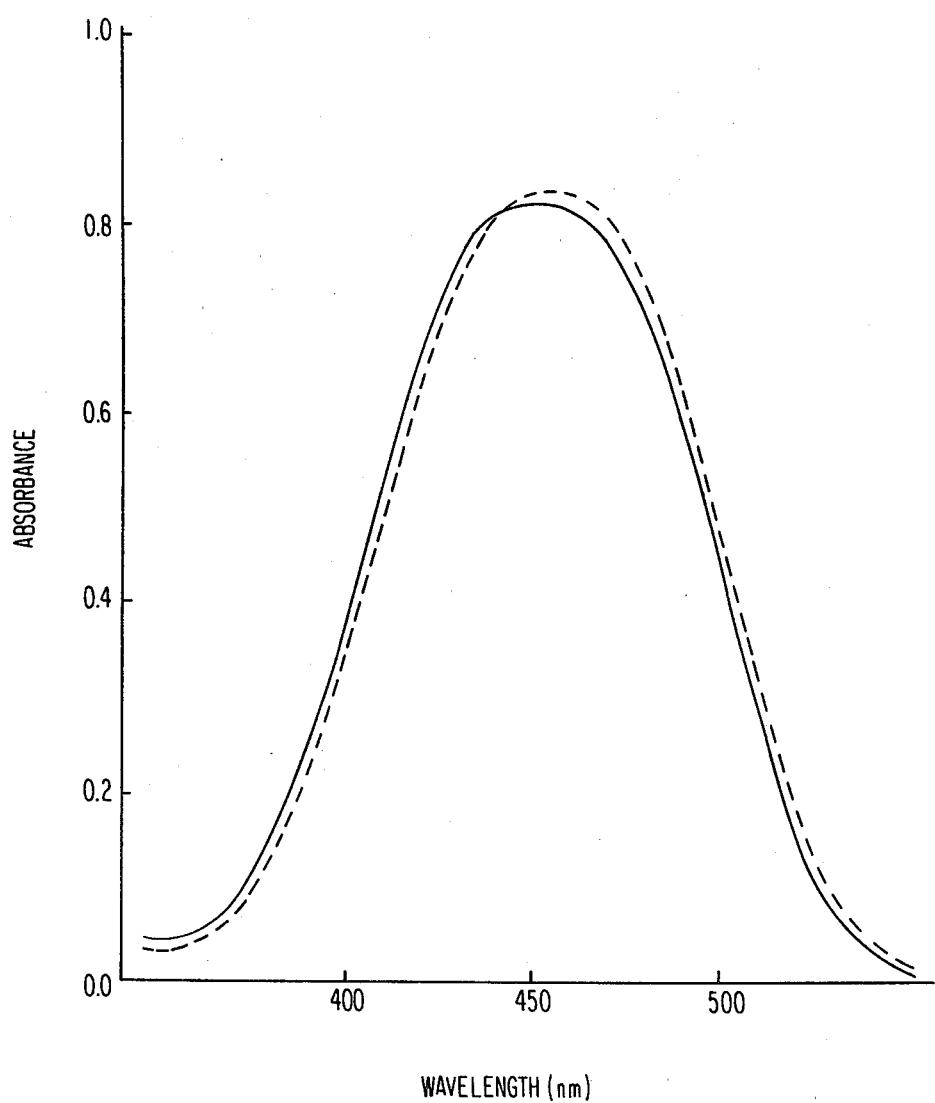
FIGS. 1 to 4 show absorption spectra of dyes (A) to (D), respectively.

In the above formulae, $B_1$ represents a hydrogen atom, an alkyl group, a substituted alkyl group, an aryl group, a substituted aryl group, an aralkyl group, or a substituted aralkyl group, and $B_2$ represents a hydrogen atom, an alkyl group, a substituted alkyl group, an aryl group, a substituted aryl group, an aralkyl group, a substituted aralkyl group, an acyl group represented by —$COR^3$ (wherein $R^3$ represents an alkyl group, a substituted alkyl group, an aralkyl group, a substituted aralkyl group, an aryl group or a substituted aryl group), an alkylsulfonyl group, a substituted alkylsulfonyl group, an arylsulfonyl group, or a substituted arylsulfonyl group. Preferred alkyl groups represented by $B_1$ and $B_2$ are alkyl groups containing 1 to 8 (more preferably 1 to 4) carbon atoms. Where $B_1$ and $B_2$ represent substituted alkyl groups, those wherein the alkyl moiety contains 1 to 8 (more preferably 1 to 4) carbon atoms are preferred. Examples of substituents for the substituted alkyl group are a sulfamoyl group represented by —$SO_2NR^4R^5$ (wherein $R^4$ represents a hydrogen atom, an alkyl group or a substituted alkyl group, $R^5$ represents a hydrogen atom, an alkyl group, a substituted alkyl group, an aralkyl group, a substituted aralkyl group, an aryl group, or a substituted aryl group, or $R^4$ and $R^5$ may combine directly or through an oxygen atom to form a 5- or 6-membered saturated ring), a carbamoyl group represented by the formula —$CONR^4R^5$ (wherein $R^4$ and $R^5$ are defined as above), a sulfonamido group represented by the formula —$NHSO_2R^3$ (wherein $R^3$ is defined as above), a carbonamido group represented by the formula —$NHCOR^3$ (wherein $R^3$ is defined as above), a cyano group, an alkoxy group containing 1 to 4 carbon atoms, a halogen atom (e.g., fluorine, chlorine, bromine and iodine), a phenyl group, and a substituted phenyl group (examples of the substituent being an alkyl group containing 1 to 4 carbon atoms, an alkoxy group containing 1 to 4 carbon atoms, a halogen atom, a sulfamoyl group, and a hydroxy group.

Preferred examples of the aryl group represented by $B_1$ and $B_2$ include a phenyl group and a naphthyl group, with a phenyl group being more preferred. Preferred examples of the aralkyl group represented by $B_1$ and $B_2$ include those wherein a $C_1$ to $C_4$ alkylene residue is bound to a phenyl group with a benzyl group and a phenethyl group being more preferred. Preferred examples of the substituents for the substituted aryl group (particularly the substituted phenyl group) and the substituted aralkyl group represented by $B_1$ and $B_2$ include an alkyl group containing 1 to 4 carbon atoms, an alkoxy group having an alkyl residue containing 1 to 4 carbon atoms, a hydroxy group, a halogen atom, a nitro group, a carboxy group, a sulfo group, a sulfamoyl group of the formula —$SO_2NR^4R^5$, a carbamoyl group of the formula —$CONR^4R^5$, a sulfonamido group of the formula —$NHSO_2R^3$, a carbonamido group of the formula —$NHCOR^3$, etc.

Preferred alkylsulfonyl groups represented by $B_1$ and $B_2$ are alkylsulfonyl groups having an alkyl moiety containing 1 to 4 carbon atoms. Preferred substituted alkylsulfonyl groups represented by $B_1$ and $B_2$ include an alkoxy group containing 1 to 4 carbon atoms, a halogen atom (e.g., fluorine, chlorine, bromine and iodine), a hydroxy group and a cyano group, etc., and they are, for example, a 2-hydroxyethylsulfonyl group, a 2-cyanoethylsulfonyl group, etc.

Preferred arylsulfonyl groups represented by $B_1$ and $B_2$ are arylsulfonyl groups having an aryl moiety containing 6 to 10 carbon atoms. Preferred substituted arylsulfonyl groups represented by $B_1$ and $B_2$ include an alkyl group containing 1 to 4 carbon atoms, an alkoxy group containing 1 to 4 carbon atoms, a halogen atom (e.g., fluorine, chlorine, bromine and iodine), a hydroxy group and a cyano group, and include, for example, a 4-methylphenylsulfonyl group, a 4-methoxyphenylsulfonyl group, etc.

$D_1$ and $D_2$ may be the same or different and each represents a hydrogen atom, an alkyl group, a substituted alkyl group, an alkoxy group, a substituted alkoxy group or a halogen atom.

$E_1$ and $E_2$ may be the same or different and each represents a hydrogen atom, a trifluoromethyl group, a cyano group, a carboxylic acid ester represented by the formula —$COOR^3$ (wherein $R^3$ is defined as above), a nitro group, a halogen atom, an alkyl group, a substituted alkyl group, an alkoxy group, a substituted alkoxy group, an alkylsulfonyl group having an alkyl moiety containing 1 to 4 carbon atoms, a substituted alkylsulfonyl group having an alkylene moiety containing 1 to 4 carbon atoms (examples of such substituents include an alkoxy group containing 1 to 4 carbon atoms, a halogen atom (e.g., fluorine, chlorine, bromine and iodine), a hydroxy group, a cyano group, etc.), an arylsulfonyl group (having an aryl moiety containing 6 to 10 carbon atoms), a substituted arylsulfonyl group (examples of the substituents being an alkyl group containing 1 to 4 carbon atoms, an alkoxy group (having an alkyl moiety containing 1 to 4 carbon atoms), a halogen atom (e.g., fluorine, chlorine, bromine and iodine), a hydroxy group, a cyano group, etc.), an alkylcarbonyl group (having an alkyl moiety containing 1 to 4 carbon atoms), a substituted alkylcarbonyl group (containing 1 to 4 carbon atoms in the alkylene moiety; examples of the substituents being a halogen atom, a cyano group, etc.), a sulfonamido group represented by the formula —$NHSO_2R^3$ (wherein $R^3$ is defined as above), a carbonamido group represented by the formula —$NHCOR^3$ (wherein $R^3$ is defined as above), a sulfamoyl group represented by the formula —$SO_2NR^4R^5$ (wherein $R^4$ and $R^5$ are defined as above), or a carbamoyl group represented by the formula —$CONR^4R^5$ (wherein $R^4$ and $R^5$ are defined as above).

In the sulfamoyl group or the carbamoyl group represented by $E_1$, $E_2$ and M, $R^4$ preferably represents a hydrogen atom, an alkyl group containing 1 to 8 (more preferably 1 to 4) carbon atoms, or a substituted alkyl group having an alkyl residue containing 1 to 8 (more preferably 1 to 4) carbon atoms. $R^5$ preferably represents a hydrogen atom, an alkyl group containing 1 to 8 (more preferably 1 to 4) carbon atoms, a substituted alkyl group having an alkyl residue containing 1 to 8 (more preferably 1 to 4) carbon atoms (examples of the substituents include an alkoxy group containing 1 to 4 carbon atoms, a halogen atom (e.g., fluorine, chlorine, bromine and iodine), a hydroxy group, a cyano group), a benzyl group, a phenyl group or a substituted phenyl group containing 6 to 9 carbon atoms (examples of the substituents include an alkyl group containing 1 to 4 carbon atoms, an alkoxy group containing 1 to 4 carbon atoms, a halogen atom (e.g., fluorine, chlorine, bromine and iodine), a hydroxy group and a cyano group). $R^4$ and $R^5$ may combine directly or through an oxygen atom to form a 5- or 6-membered saturated ring (for example, an N-piperidinosulfamoyl group, an N-piperidinocarbamoyl group, an N-morpholinosulfamoyl group or an N-morpholinocarbamoyl group). Of these, (i) the case where $R^4$ and $R^5$ both represent hydrogen atoms or (ii) the case where at least one of $R^4$ and $R^5$ represents a hydrogen atom and the other represents an alkyl group containing 1 to 4 carbon atoms are particularly preferred in view of their cost, availability, and excellent transfer properties.

$R^1$ represents an alkylene group containing two or more carbon atoms, and $R^2$ represents an alkyl group or a substituted alkyl group. $R^1$ may be straight or branched, and alkylene groups which contain 2 to 8 carbon atoms are preferred. (Branched alkylene groups which form an acetal bond, i.e., both oxygen atoms in the $-O-R^1-O-R^2$ moiety are bound to the same carbon atom, are excluded.) Preferred examples of $R^1$ are a straight chain alkylene group represented by the formula $-(CH_2)_p-$ (wherein p is an integer of 2 to 4) and a branched chain alkylene group containing 3 to 4 carbon atoms (e.g., $-CH(CH_3)CH_2-$, $-CH_2-CH_2-CH(CH_3)-$, and the like). From the standpoint of the availability of starting materials, it is particularly advantageous if $R^1$ represents $-CH_2-CH_2-$. Where $R^1$ represents a methylene group, an acetal structure, $-O-CH_2-O-R^2$, results which is chemically unstable (especially under acidic conditions) and will decompose during synthesis.

The alkyl group represented by $R^2$ may be straight or branched chain, and preferably contains 1 to 8 carbon atoms. From the standpoint of synthesis, an unsubstituted alkyl group is preferred. Particularly preferred examples include straight or branched chain alkyl groups containing 1 to 4 carbon atoms (for example, a methyl group, an ethyl group, an n-propyl group, an isopropyl group, an n-butyl group, and the like). A methyl group or an ethyl group is particularly preferred, with a methyl group being most preferred. Illustrative substituents for the substituted alkyl group represented by $R^2$ are an alkoxy group containing 1 to 4 carbon atoms (e.g., a methoxy group, an ethoxy group, or the like), a dialkylamino group (e.g., a diethylamino group or the like), a halogen atom (e.g., chlorine, bromine and iodine), a cyano group and a hydroxy group, preferably an alkoxy group.

Preferred examples of $R^3$ in $-COR^3$ for $B_2$ include an alkyl group containing 1 to 8 (more preferably 1 to 4) carbon atoms, a substituted alkyl group having an alkyl residue containing 1 to 8 (more preferably 1 to 4) carbon atoms, a phenyl group, and a substituted phenyl group containing 6 to 9 carbon atoms (examples of the substituent being an alkyl group containing 1 to 4 carbon atoms, an alkoxy group containing 1 to 4 carbon atoms, a halogen atom, and a sulfamoyl group).

Preferred examples of the substituents for the substituted alkyl group represented by $R^3$ include an alkoxy group (having alkyl moiety containing 1 to 4 carbon atoms), a halogen atom (e.g., fluorine, chlorine, bromine and iodine), a hydroxy group and a cyano group.

M represents a hydrogen atom, an alkyl group, a substituted alkyl group, an alkoxy group, a substituted alkoxy group, a halogen atom, a sulfamoyl group represented by $-SO_2NR^4R^5$ (wherein $R^4$ and $R^5$ are defined as above), or a carbamoyl group represented by $-CONR^4R^5$ (wherein $R^4$ and $R^5$ are defined as above).

Preferred alkyl groups represented by $D_1$, $D_2$, $E_1$, $E_2$ and M contain 1 to 8 (more preferably 1 to 4) carbon atoms. Where they represent substituted alkyl groups, they are preferably substituted alkyl groups having an alkyl residue containing 1 to 8 (more preferably 1 to 4) carbon atoms. Examples of substituents for the substituted alkyl groups represented by $D_1$, $D_2$, $E_1$, $E_2$ and M and for the substituted alkyl groups represented by $R^3$, $R^4$ and $R^5$ are a cyano group, an alkoxy group containing 1 to 4 carbon atoms, a hydroxy group, a carboxy group, a sulfo group, a halogen atom (e.g., fluorine, chlorine, bromine and iodine), etc. In addition, the substituted alkyl groups represented by $R^3$, $R^4$ and $R^5$ can be substituted by a sulfonamido group represented by the formula $-NHSO_2R^3$ (wherein $R^3$ is defined as above), a carbonamido group represented by the formula $-NHCOR^3$ (wherein $R^3$ is defined as above), a sulfamoyl group represented by the formula $-SO_2NR^4R^5$ (wherein $R^4$ and $R^5$ are defined as above), and a carbamoyl group represented by $-CONR^4R^5$ (wherein $R^4$ and $R^5$ are defined as above).

Preferred examples of the aryl group represented by $R^3$ or $R^5$ are a phenyl group and a naphthyl group with a phenyl group being more preferred. Preferred examples of the aralkyl group represented by $R^3$ or $R^5$ include those wherein an alkylene residue containing 1 to 4 carbon atoms is bound to a phenyl group, with a benzyl group and a phenethyl group being more preferred.

Preferred examples of the substituents for the substituted aryl group (particularly the substituted phenyl group) and the substituted aralkyl group represented by $R^3$ and $R^5$ are an alkyl group containing 1 to 4 carbon atoms, an alkoxy group having an alkyl residue containing 1 to 4 carbon atoms, a hydroxy group, a halogen atom (e.g., fluorine, chlorine, bromine and iodine), a nitro group, a carboxy group, a sulfo group, a sulfamoyl group, a carbamoyl group, a sulfonamido group, a carbonamido group, etc.

As the halogen atom represented by $D_1$, $D_2$, $E_1$, $E_2$ or M, a fluorine atom, a chlorine atom, a bromine atom and an iodine atom are preferred and a chlorine atom is particularly preferred.

The alkoxy groups and substituted alkoxy groups represented by $D_1$, $D_2$, $E_1$, $E_2$ or M, preferably have alkyl moiety containing 1 to 8 (more preferably 1 to 4) carbon atoms, are preferred. The substituents for alkoxy group represented by $D_1$, $D_2$, $E_1$, $E_2$ or M can be a cyano group, a halogen atom (e.g., chlorine), a hydroxy group or a dialkylamino group (having an alkyl moiety containing 1 to 3 carbon atoms).

Z represents a hydrogen atom, a straight chain, branched chain or cyclic alkyl group containing 1 to 6 (more preferably 1 to 4) carbon atoms, which may be substituted, with a hydrogen atom being preferred.

Preferred examples of the substituents for the substituted alkyl group represented by Z include an alkoxy group (having alkyl moiety containing 1 to 4 carbon atoms), a halogen atom (e.g., fluorine, chlorine, bromine and iodine), a hydroxy group and a cyano group.

X represents a divalent linking group represented by the formula of $-T-A_n(J)_p$ wherein J represents a divalent group selected from a sulfonyl group and a carbonyl group, with a sulfonyl group being preferred. A represents an alkylene group such as an ethylene group, a propylene group, etc., an aralkylene group such as a phenylmethylene group, etc., or an arylene group such as a phenylene group, etc. T represents a divalent group selected from an oxy group, a carbonyl group, a carboxyamido group, a carbamoyl group, a sulfonamido group, a sulfamoyl group, a sulfinyl group, and a sulfonyl group, and n and p may be the same or different and each represents 0 or 1. More preferably, X represents —T—C$_6$H$_4$—J—, —T—arylene—J—, —T—alkylene—J—, —SO$_2$— or —CO— (wherein T represents a divalent group selected from a carboxyamido group, a carbamoyl group, a sulfonamido group, and a sulfamoyl group, and J represents a divalent sulfonyl group or carbonyl group). In addition, where q=0 in the formula (II), compounds wherein n=p=0 are also preferred.

The above-described arylene group (A) includes a phenylene group and a phenylene group substituted by an alkyl group containing 1 to 4 carbon atoms, an alkoxy group containing 1 to 4 carbon atoms, an alkoxyalkoxy group (having each alkyl moiety containing 1 to 6 (more preferably 1 to 4) carbon atoms), or the like.

In view of the diffusion rate of a released dye, particularly preferred compounds are those wherein X represents —SO$_2$— or —CO— and, with respect to the formula (II), when q=0, n=p=0 is also preferred.

L is an alkylene group or an arylene group. The alkylene group represented by L may be straight chain or branched chain, and those which contain 1 to 8 (more preferably 1 to 4) carbon atoms are suited.

q represents 0 or 1 and, of the compounds represented by the general formulae (I) and (II), those represented by the general formula (I) are more preferred from the point of synthesizing them.

Y represents the diffusibility-controlling moiety, i.e., a moiety which, as a result of development processing under alkaline conditions, provides an azo dye compound having a different diffusibility from that of the azo dye image-forming compound represented by the formula (I) or (II).

As an example of the compound represented by the general formula (I) or (II), mention may be made of a non-diffusible dye-providing compounds (dye-releasing redox compounds) which can provide a diffusible dye through self-cleavage oxidation thereof upon development. The diffusibility controlling moiety Y for this type compound is an N-substituted sulfamoyl group. As an example of the moiety Y, mention may be made of a moiety represented by the following formula (A):

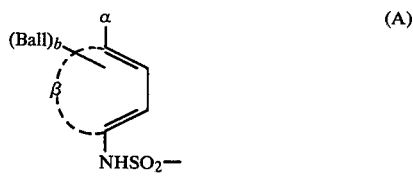

(A)

Therein, β represents the non-metal atoms necessary to form a benzene ring, which benzene ring may be condensed with a carbocyclic ring or a heterocyclic ring to form a condensed ring such as a naphthalene ring, a quinoline ring, a 5,6,7,8-tetrahydronaphthalene ring, a chroman ring and so on. Further, the above-described benzene ring or the condensed ring may be substituted with a halogen atom, an alkyl group, an alkoxy group, an aryl group, an aryloxy group, a nitro group, an amino group, an alkylamino group, an arylamino group, an amido group, a cyano group, an alkylmercapto group, a keto group, a carboalkoxy group, a hetero ring residue (to which some substituents may be attached) or so on.

α represents a group of the formula —OG$^1$ or —NHG$^2$. Therein, G$^1$ represents a hydrogen atom or a group capable of producing a hydroxy group when hydrolyzed (a hydrolyzable group), with preferred examples including groups represented by the formula

and groups represented by the formula

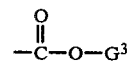

(wherein G$^3$ represents an alkyl group having 1 to 18 carbon atoms, particularly methyl, ethyl, propyl, etc.; a halogen substituted alkyl group having 1 to 18 carbon atoms such as chloromethyl, trifluoromethyl, etc.; a phenyl group or a substituted phenyl group). On the other hand, G$^2$ represents a hydrogen atom, an alkyl group having 1 to 22 carbon atoms or a hydrolyzable group. Preferred examples of the hydrolyzable group represented by G$^2$ include a group of the formula

a group of the formula —SO$_2$G$^5$ and —SOG$^5$. Therein, G$^4$ represents an alkyl group containing 1 to 4 carbon atoms such as a methyl group; a halogen substituted alkyl group such as a mono-, di- or trichloromethyl group, or a trifluoromethyl group; an alkylcarbonyl group such as an acetyl group; an alkyloxy group; a substituted phenyl group such as a nitrophenyl or a cyanophenyl group; a phenyloxy group per se or a phenyloxy group substituted with a lower alkyl group or a halogen atom; a carboxyl group; an alkyloxycarbonyl group; an aryloxycarbonyl group; an alkylsulfonylethoxy group, or an arylsulfonylethoxy group. On the other hand, G$^5$ represents a substituted or an unsubstituted alkyl group or an aryl group.

In addition, b represents an integer of 0, 1 or 2. Therein, b must be 1 or 2 and is preferably 1 except when α represents the group —NHG$^2$ and G$^2$ contains a group (equivalent to an alkyl group) which renders the compound immobile and nondiffusible (i.e., b is 1 or 2 when α represents a group of the formula —OG$^1$ or a group of the formula —NHG$^2$ and G$^2$ represents a hydrogen atom, an alkyl group having 1 to 8 carbon atoms or a hydrolyzable group).

Ball represents a ballast group, which will be described in detail hereinafter.

Specific examples of the moiety Y of the above-described kind are described in Japanese Patent Application (OPI) No. 50736/78 and U.S. Pat. No. 3,928,312.

As another example of the moiety Y suitable for a dye-releasing redox compound may be made represented by the following formula (B):

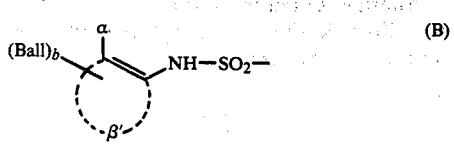

wherein Ball, α and b, respectively, have the same meanings as in the formula (A), and β' represents atoms necessary to form a carbocyclic ring such as a benzene ring, which ring may be condensed with a carbocyclic ring or a heterocyclic ring to form a condensed ring system such as a naphthalene ring, a quinoline ring, a 5,6,7,8-tetrahydronaphthalene ring, a chroman ring, etc. Further, each of the above-described rings may be substituted with a halogen atom, an alkyl group, an alkoxy group, an aryl group, an aryloxy group, a nitro group, an amino group, an alkylamino group, an arylamino group, an amido group, a cyano group, an alkylmercapto group, a keto group, a carboalkoxy group, a heterocyclic ring (which may be further substituted), etc. Specific examples of the moiety Y of the above-described kind are described in Japanese Patent Application (OPI) No. 113624/76, Japanese Patent Application No. 91187/79, and U.S. Pat. Nos. 4,053,312 and 4,055,428.

As still another example of Y is a moiety represented by the formula (C):

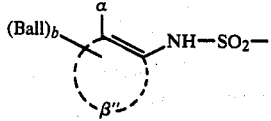

wherein Ball, b and α, respectively, have the same meanings as in the formula (A), and β" represents the atoms necessary to form a heterocyclic ring such as a pyrazole ring, a pyridine ring or the like, which may be condensed with a carbocyclic ring or a heterocyclic ring. In addition, each of the above-described various rings may be substituted with the same kinds of substituents as described for the rings in the formula (B). Specific examples of this Y moiety are described in Japanese Patent Application (OPI) No. 104343/76.

As a further example of Y there is the moiety represented by the formula (D):

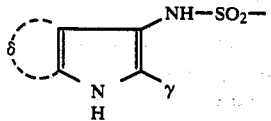

wherein γ preferably represents a hydrogen atom, or an alkyl group, an aryl group or a heterocyclic ring residue, which may be substituted or unsubstituted, or a —CO—G⁶ group where G⁶ represents —OG⁷, —SG⁷ or

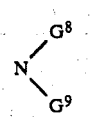

(wherein G⁷ represents a hydrogen atom, an alkyl group, a cycloalkyl group or an aryl group, which groups each may bear substituents; G⁸ has the same definition as G⁷ or an acyl group derived from an aliphatic or an aromatic carboxylic acid or from a sulfonic acid; and G⁹ represents a hydrogen atom or a substituted or unsubstituted alkyl group); and δ represents the atoms necessary to complete a condensed benzene ring and further, the condensed benzene ring completed may bear one or more of substituents; and γ and/or the condensed benzene ring completed by the moiety δ must bear a ballast group or a group containing a ballast group. Specific examples of this Y moiety are described in Japanese Patent Application (OPI) Nos. 104343/76, 130122/79 and 46730/78.

As another example of the Y moiety suitable for the compound, mention may be made of the moiety represented by the formula (E):

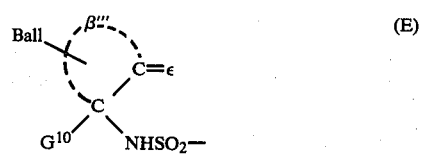

In the formula (E), Ball has the same meaning as in the formula (A), and ε represents an oxygen atom or =NG¹¹ (where G¹¹ represents a hydroxy group or an amino group which may be substituted). In case of ε=NG¹¹, the =C=N—G¹¹ group is formed by dehydration reaction of a carbonyl compound of the formula H₂N—G¹¹ with a ketone group. G¹¹ is determined by the compounds of the formula H₂N—G¹¹ employed as the carbonyl reagent. Representative examples are hydroxylamine, hydrazines, semicarbazides, thiosemicarbazides and the like. Specific examples of hydrazines include hydrazine; phenylhydrazine and substituted phenylhydrazines whose phenyl moiety bears a substituent such as an alkyl group, an alkoxy group, a carboalkoxy group, a halogen atom, etc.; isonicotinic acid hydrazide; and the like. Specific examples of semicarbazides include, by analogy to hydrazines, phenylsemicarbazide and substituted phenylsemicarbazides whose phenyl moiety bears a substituent such as an alkyl group, an alkoxy group, a carboalkoxy group, a halogen atom, etc., and specific examples of thiosemicarbazides also include various derivatives similar to those of the semicarbazides.

β''' in the formula (E) represents the atoms necessary to form a 5-, 6- or 7-membered saturated or unsaturated non-aromatic hydrocarbon ring with specific examples including cyclopentanone, cyclohexanone, cyclo hexenone, cyclopentenone, cycloheptanone, cycloheptenone and the like. In addition, the above-described non-aromatic hydrocarbon rings may be further fused with other carbocyclic, heterocyclic or aromatic rings at appropriate positions thereon to form a condensed system. However, when β''' forms a condensed ring, a condensed ring formed by benzene and the above-described 5- to 7-membered non-aromatic hydrocarbon ring such as indanone, benzocyclohexenone, benzocycloheptenone and the like, is more desirable in the present invention.

The above-described 5- to 7-membered non-aromatic hydrocarbon rings and the above-described condensed rings may bear one or more substituents such as an alkyl group, an aryl group, an alkyloxy group, an aryloxy group, an alkylcarbonyl group, an arylcarbonyl group, an alkylsulfonyl group, an arylsulfonyl group, a halogen atom, a nitro group, an amino group, an alkylamino group, an arylamino group, an amido group, an alkylamido group, an arylamido group, a cyano group, an alkylmercapto group, an alkyloxycarbonyl group, etc.

$G^{10}$ represents a hydrogen atom or a halogen atom such as fluorine, chlorine, bromine or the like.

Specific examples of this Y moiety are described in Japanese Patent Application (OPI) No. 3819/78.

As other examples of the suitable Y moieties for diffusible dye-providing compounds are described in U.S. Pat. Nos. 3,443,930, 3,443,939, 3,628,952, 3,844,785 and 3,443,943, etc.

Formulae (I) and (II) also represent nondiffusible, dye-providing compounds that can release a diffusible dye through self-ring-closure under an alkaline condition, but stops substantially releasing the dye as a result of the reaction with the oxidized developer. The diffusibility controlling Y moiety effective for these compounds can be represented by the following formula (F):

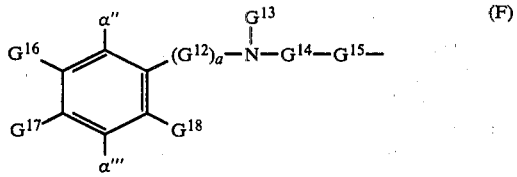

In the formula (F), $\alpha''$ represents an oxidizable nucleophilic group such as a hydroxyl group, a primary or a secondary amino group, a hydroxyamino group, a sulfonamido group or the like, or the precursor thereof and is preferably a hydroxyl group.

$\alpha'''$ represents a dialkylamino group or one of the groups defined in $\alpha''$ and is preferably a hydroxyl group.

$G^{14}$ represents an electrophilic group such as —CO—, —CS— or the like, and is preferably —CO—.

$G^{15}$ represents an oxygen atom, a sulfur atom, a selenium atom, a nitrogen atom or the like, wherein the nitrogen atom may be substituted with a hydrogen atom, an unsubstituted or substituted alkyl group having 1 to 10 carbon atoms or an aryl group having 6 to 20 carbon atoms. An oxygen atom is preferred as $G^{15}$.

$G^{12}$ represents an alkylene group having 1 to 3 carbon atoms.

a represents 0 or 1 and preferably 0.

$G^{13}$ represents a substituted or an unsubstituted alkyl group having 1 to 40 carbon atoms, or a substituted or an unsubstituted aryl group having 6 to 40 carbon atoms and is preferably an alkyl group.

$G^{16}$, $G^{17}$ and $G^{18}$ each represents a hydrogen atom, a halogen atom, a carbonyl group, a sulfamoyl group, a sulfonamido group, an alkyloxy group having 1 to 40 carbon atoms or the same groups as defined for $G^{13}$. $G^{16}$ and $G^{17}$ may combine with each other to form a 5- to 7-membered ring. In addition, $G^{17}$ may represent

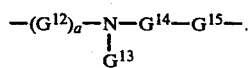

Therein, at least one of groups $G^{13}$, $G^{16}$, $G^{17}$ and $G^{18}$ must be a ballast group. Specific examples of this Y moiety are described in Japanese Patent Application (OPI) No. 63618/76 and U.S. Pat. No. 3,980,479.

Another example of the Y moiety suitable for the nondiffusible dye-providing compound is represented by the formula (G):

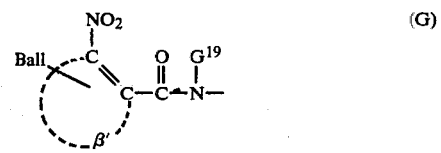

wherein Ball and $\beta'$ have the same meanings as defined in the formula (B), respectively, and $G^{19}$ represents an alkyl group (including substituted alkyl groups).

Specific examples of this Y moiety are described in Japanese Patent Application (OPI) No. 35533/78.

Still another example of the Y moiety suitable for the compounds of this invention is represented by the following general formula (H):

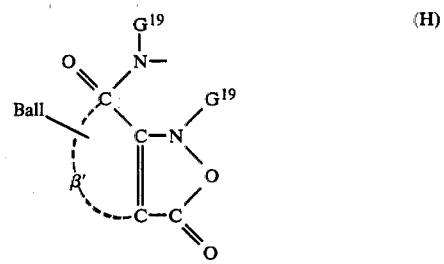

wherein Ball and $\beta'$ have the same meanings as defined in the formula (B), respectively, and $G^{19}$ has the same meanings as defined in the formula (G). Specific examples are described in Japanese Patent Application (OPI) No. 4819/77 and U.S. Pat. No. 3,421,964.

Still another type of compound represented by the general formula (I) is a nondiffusible compound which releases a diffusible dye at the time of the coupling reaction with the oxidation product of a color developer produced by oxidation of the developer with the optically exposed silver halide (dye-releasing coupler). Representative examples of the Y moiety effective for dye-releasing couplers are described in U.S. Pat. No. 3,227,550. A specific example of such a moiety Y is represented by the formula (J):

(Ball-Coup)$_t$-Link-      (J)

In the formula (J), Coup represents a coupler residue capable of coupling with the oxidation product of a color developer, with specific examples including a 5-pyrazolone coupler residue, a phenol coupler residue, a naphthol coupler residue, an indanone coupler residue and an open-chain ketomethylene coupler residue, and Ball represents a ballast group.

Link is attached to the active site of the Coup moiety and represents a group whose bond to the Coup moiety is split when the dye-providing compound undergoes coupling reaction with the oxidation product of the color developer used. Specific examples of Link include an azo group, an azoxy group, —O—, —Hg—, an alkylidene group, —S—, —S—S— and —NHSO$_2$—.

t represents 1 or 2 when Link is an alkylidene group, or 1 when Link is one of the above-described groups other than an alkylidene group.

Preferred examples of the Y moiety represented by the formula (J) include those which contain as the Coup moiety a phenol coupler residue, a naphthol coupler residue or an indanone coupler residue and contain an —NHSO₂— group as the Link group.

As an example of a further different type of the compound represented by the general formula (I) or (II), mention may be made of such a compound that it is diffusible under an initial alkaline condition, but it becomes non-diffusible when oxidized by a developing treatment (namely developer dye). Representative examples of the moiety Y effective for the compound of the above-described type are described in U.S. Pat. No. 2,983,606.

Of the above-described compounds, particularly desirable compounds for the use in the present invention are dye-releasing redox compounds, and the most effective group as Y is an N-substituted sulfamoyl group. Preferred N-substituents of the N-substituted sulfamoyl group are a carbon ring residue and a hetero ring residue. As examples of the N-carbon ring-substituted sulfamoyl group, those which are represented by the formula (A) and the formula (B), respectively, are particularly preferred. As examples of the N-heterocyclic ring-substituted sulfamoyl group, those which are represented by the formula (C) and the formula (D), respectively, are particularly preferred.

Particularly preferred of the moieties represented by the formula (A) are illustrated below. Therein α is represented by —OG¹. G¹ represents a hydrogen atom or a group capable of producing a hydroxy group upon hydrolysis, for example, a group represented by

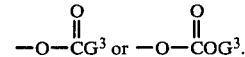

G³ represents an alkyl group having 1 to 18 (particularly preferably 1 to 4) carbon atoms, a halogen substituted alkyl group having 1 to 18 (particularly preferably 1 to 4) carbon atoms, a phenyl group and a substituted phenyl group having 6 to 14 (preferably 6 to 10) carbon atoms. β represents non-metal atoms necessary to form a benzene ring, wherein a naphthalene ring is particularly preferred as such a benzene ring. On such a naphthalene ring, a halogen atom, an alkyl group (having preferably 1 to 10 carbon atoms), an alkoxy group (having preferably 1 to 10 carbon atoms), a substituted alkyl group (having preferably 1 to 10 carbon atoms), a phenyl group, a substituted phenyl group (having preferably 6 to 10 carbon atoms), a naphthyl group, a substituted naphthyl group (having preferably 10 to 14 carbon atoms), a phenoxy group, a substituted phenoxy group (having preferably 6 to 10 carbon atoms), a naphthyloxy group, a substituted naphthyloxy group (having preferably 10 to 14 carbon atoms), a nitro group, an amino group, a mono- or dialkylamino group (having preferably 1 to 10 carbon atoms), a mono- or di-substituted alkylamino group (having preferably 1 to 10 carbon atoms), an arylamino group (having preferably 6 to 14 carbon atoms), an amido group (having preferably 1 to 10 carbon atoms), a cyano group, an alkylthio group (having preferably 1 to 10 carbon atoms), a keto group (having preferably 2 to 11 carbon atoms), a carboalkoxy group (having preferably 2 to 11 carbon atoms) or a hetero ring residue (which hetero ring is constituted by preferably 3 to 10 atoms) may be substituted in addition to a ballast group. Ball represents a ballast group, and b is preferably 1.

Particularly preferred of the moieties represented by the general formula (B) are illustrated below. Therein, α is preferably —OG¹ and G¹ represents a hydrogen atom or a group capable of producing a hydroxy group upon hydrolysis such as

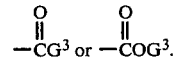

Therein, G³ represents an alkyl group having 1 to 18 carbon atoms and more preferably having 1 to 4 carbon atoms; a halogen substituted alkyl group having 1 to 18 carbon atoms and more particularly having 1 to 4 carbon atoms; a phenyl group; or a substituted phenyl group having 6 to 14 carbon atoms and preferably having 6 to 10 carbon atoms. β' represents the non-metal atoms necessary to form a benzene ring. On this benzene ring, in addition to a ballast group, a wide variety of group may be substituted. Specific examples of such a substituent include a halogen atom, an alkyl group (having preferably 1 to 10 carbon atoms), an alkoxy group (having preferably 1 to 10 carbon atoms), a phenyl group, a substituted phenyl group (having preferably 6 to 11 carbon atoms), an aryloxy group (having preferably 6 to 11 carbon atoms), a nitro group, an amino group, an alkylamino group (having preferably 1 to 10 carbon atoms), an arylamino group (having preferably 6 to 11 carbon atoms), an amido group, a cyano group, an alkylthio group (having preferably 1 to 10 carbon atoms), a keto group (having preferably 2 to 11 carbon atoms), a carboalkoxy group (having preferably 2 to 11 carbon atoms), a heterocyclic ring residue, etc. Ball represents a ballast group, and b is preferably 1.

Particularly preferred of the moieties represented by the formula (C) are illustrated below. Therein, α is preferably a hydroxy group, but it may be a group capable of producing a hydroxy group upon the hydrolysis such as a group represented by

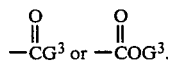

G³ in such groups represents an alkyl group having 1 to 18 carbon atoms and particularly 1 to 4 carbon atoms; a halogen substituted alkyl group having 1 to 18 carbon atoms and particularly 1 to 4 carbon atoms; a phenyl group; or a substituted phenyl group having 6 to 14 carbon atoms and particularly 6 to 10 carbon atoms. β'' represents atoms necessary to form a pyrazole ring. On such a pyrazole ring, a halogen atom, an alkyl group (having preferably 1 to 10 carbon atoms), an alkoxy group (having preferably 1 to 10 carbon atoms), a substituted alkyl group (having preferably 1 to 10 carbon atoms), a phenyl group, a substituted phenyl group (having preferably 6 to 10 carbon atoms), a phenoxy group, a substituted phenoxy group (having preferably 6 to 10 carbon atoms), a naphthyl group, a substituted naphthyl group (having preferably 10 to 14 carbon atoms), a naphthyloxy group, a substituted naphthyloxy group (having preferably 10 to 14 carbon atoms), a nitro group, an amino group, a mono- or dialkylamino group (having preferably 1 to 10 carbon atoms), a mono- or di-substituted alkylamino group (having preferably 1 to 10 carbon atoms), an arylamino group (having preferably 6 to 14 carbon atoms), an amido group (having preferably 1 to 10 carbon atoms), a cyano group, an alkylthio group (having preferably 1 to 10 carbon atoms), a keto group (having preferably 2 to 11 carbon atoms), a carboalkoxy group (having preferably 2 to 11 carbon atoms) or a hetero ring (which is comnstituted by preferably 3 to 10 carbon atoms) may be substituted in addition to a ballast group (Ball). b is preferably 1.

In particularly preferred moieties represented by the general formula (D), γ is —$COG^6$ and $G^6$ represents —$OG^7$, —$SG^7$ or

Therein, $G^7$ represents a hydrogen atom, or an alkyl group having 1 to 32 carbon atoms (e.g., methyl, ethyl, isopropyl, n-octadecyl, etc.), a cycloalkyl group (e.g., cyclohexyl, etc.) or an aryl group (e.g., phenyl, etc.), which groups each may bear substituents. Specifically, the alkyl group may be substituted by a hydroxyl group, an alkoxy group, an aryloxy group, a halogen atom, a carboxyl group or a sulfo group, and the aryl group may bear a substituent such as a halogen atom, an alkyl group, an alkoxy group, a dialkylamino group, an acylamino group, a carboxyl group or a sulfo group.

$G^8$ represents one of the groups defined for $G^7$, or an acyl group derived from an aliphatic or an aromatic carboxylic acid or sulfonic acid. $G^9$ represents a hydrogen atom or an unsubstituted or substituted alkyl group having 1 to 32 carbon atoms.

The aforementioned condensed benzene ring completed by the moiety δ may have one or more substituents. Specific examples of such a substituent include a halogen atoms (such as chlorine, bromine, etc.); an alkyl group having 1 to 32 carbon atoms (for example, a methyl group, a butyl group, a hexadecyl group, etc.); an aryl group (for example, a phenyl group), which aryl group may have a substituent such as a halogen atom, an alkyl group, an alkoxy group, a dialkylamino group and an acylamino group; an aralkyl group (for example, benzyl group); a cycloalkyl group (for example, a cyclohexyl group); an alkoxy group (for example, a methoxy group, an ethoxy group, a dodecyloxy group, a hexadecyloxy group or the like); an aralkoxy group (for example, a benzyloxy group); an acylamino group or an acyl group (which acyl moiety or group may be derived from an aliphatic or an aromatic carboxylic acid or sulfonic acid); a cyano group; a sulfo group; a carboxyl group; a sulfamoyl group or a carbamoyl group (one or more of a hydrogen atom attached to the nitrogen atom of which may be replaced by a group such as an alkyl group); or δ represents the atoms necessary to complete a condensed carbon cyclic or heterocyclic ring, etc.

On the occasion that the above-described condensed benzene ring completed by the moiety δ has plural substituents, all of these substituents do not need to be the same.

The dye-releasing redox compounds employed in embodiments of the present invention must not diffuse into adjacent photographic layers before development. For this purpose, such compounds have ballast groups in, for example, the residue $G^6$ or the substituents on the aforementioned condensed benzene rings completed by the δ moieties.

Even in the case that the substituent on the aforementioned condensed benzene ring completed by the moiety δ or the residue $G^6$ does not contain a long chain alkyl group, it is feasible for the aforementioned dye-releasing redox compounds to possess satisfactory diffusion resisting property. The size of the molecule of the redox compound can be controlled so as to be sufficiently large, compared with the size of the aforementioned dye residue, by choosing the size of the condensed benzene ring properly. Further, sufficiently high diffusion resistance can be imparted to the dye-releasing redox compound by choosing a sufficiently large-sized ballast group, as well.

On the occasion that the substituent on the condensed benzene ring in the aforementioned indole moiety or the $G^6$ group is a divalent group, it may be the group connecting one indole ring to the other indole ring. Specific examples of the dye-releasing redox compounds of this type are illustrated below:

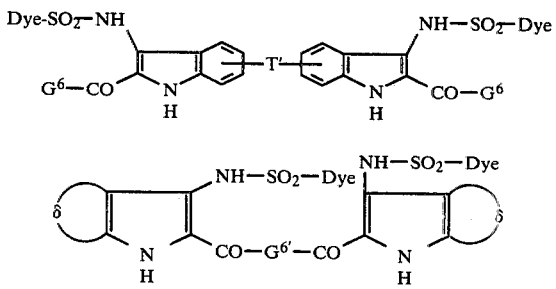

wherein Dye represents a moiety corresponding to the formula (I) or (II) with the exclusion of the moiety Y from the formula (I) or (II), T' represents a divalent substituent on the benzene ring completed by the moiety δ such as an alkylene group, an arylene group, a divalent substituent of the alkoxy group, etc., and $G^{6'}$ represents a divalent counterpart of the $G^6$ group.

Similarly, in cases of other dye-releasing type image-forming compounds, two molecules of such a compound can be also connected by the group T'.

The ballast group is an organic ballast group capable of rendering the dye-releasing redox compound nondiffusible during development in an alkaline processing solution and preferably has a hydrophobic moiety having 8 to 40 carbon atoms. Such an organic ballast group is bonded to the dye-releasing redox compound directly or through a bridging group, for example, an imino bond, an ether bond, a thioether bond, a carbonamido bond, a sulfonamido bond, a ureido bond, an ester bond, an imido bond, a carbamoyl bond, a sulfamoyl bond, or like bond alone or in combination.

Specific examples of ballast groups are set forth below. They are an alkyl group or an alkenyl group (for example, a dodecyl group, an octadecyl group, etc.), an alkoxyalkyl group (for example, a 3-(octyloxy)propyl group, a 3-(2-ethylundecyloxy)propyl group, etc., as described in Japanese Patent Publication No. 27563/64), an alkylaryl group (for example, a 4-nonylphenyl group, a 2,4-di-tert-butylphenyl group, etc.), an alkylaryloxyalkyl group (for example, a 2,4-di-tert-pentylphenoxymethyl group, an α-(2,4-di-tert-pentylphenoxy)propyl group, a 1-(3-pentadecylphenoxy)ethyl group, etc.), an acylamidoalkyl group (for example, a 2-(N-butylhexadecaneamido)ethyl group, groups as described in U.S. Pat. Nos. 3,337,344 and 3,418,129, etc.), an alkoxyaryl or aryloxyaryl group (for example, a 4-(n-octadecyloxy)phenyl group, a 4-(4-n-dodecylphenyloxy)phenyl group, etc.), a residue having both a long-chain aliphatic group (which may be a long-chain alkyl or alkenyl group) and a group capable of rendering the residue soluble in water such as a carboxyl group or a sulfamoyl group (for example, a 1-carboxymethyl-2-nonanedecenyl group, a 1-sulfoheptadecyl group, etc.), an alkyl group substituted with an ester group (for example, a 1-ethoxycarbonylheptadecyl group, a 2-(n-dodecyloxycarbonyl)ethyl group, etc.), an alkyl group substituted with an aryl group or a heterocyclic group (for example, a 2-[4-(3-methoxycarbonylheneicosaneamido)phenyl]ethyl group, a 2-[4-(2-n-octadecylsuccinimido)phenyl]ethyl group, etc.), and an aryl group substituted with an aryloxyalkoxycarbonyl group (for example, a 4-[2-(2,4-di-tert-pentylphenoxy)-2-methylpropyloxycarbonyl]phenyl group, etc.).

Of the above-described organic ballast groups, those which are bonded to bridging groups as represented in the following general formulae are particularly preferred.

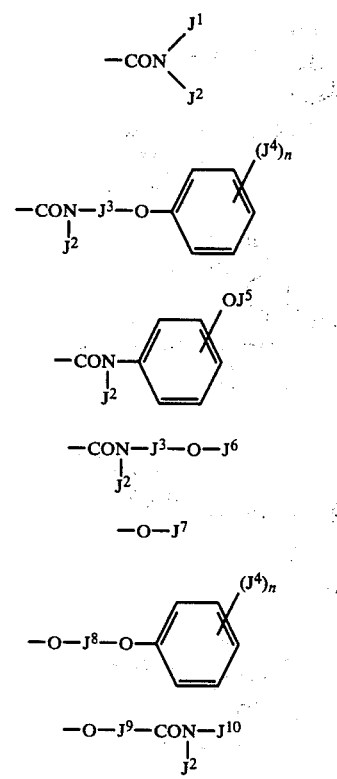

Therein, $J^1$ represents a straight chain or branched chain alkyl group having 7 to 39 carbon atoms and preferably having 7 to 32 carbon atoms (for example, a dodecyl group, a tetradecyl group, a hexadecyl group, etc.); $J^2$ represents a hydrogen atom or a straight or branched chain alkyl group having 1 to 39 carbon atoms and preferably 1 to 32 carbon atoms; $J^3$ represents a straight chain or branched chain alkylene group having 1 to 10 carbon atoms and preferably 1 to 6 carbon atoms (for example, a propylene group, a butylene group, etc.); $J^4$ represents a hydrogen atom or a straight chain or branched chain alkyl group having 1 to 32 carbon atoms and preferably 1 to 25 carbon atoms (for example, a tert-amyl group, a pentadecyl group, etc.); $J^5$ represents a straight chain or branched chain alkyl group having 1 to 33 carbon atoms and preferably 1 to 25 carbon atoms or a group

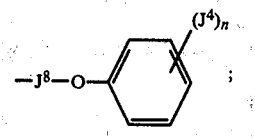

$J^6$ represents a straight chain or branched chain alkyl group having 1 to 37 carbon atoms and preferably 1 to 25 carbon atoms; $J^7$ represents an alkyl group having 8 to 40 carbon atoms and preferably 8 to 32 carbon atoms; $J^8$ represents a straight chain or branched chain alkylene group having 1 to 10 carbon atoms and preferably 1 to 6 carbon atoms; $J^9$ represents a straight chain or branched chain alkylene group having 1 to 38 carbon atoms and preferably 1 to 30 carbon atoms; $J^{10}$ represents an alkyl group having 1 to 38 carbon atoms and preferably 1 to 30 carbon atoms or a group

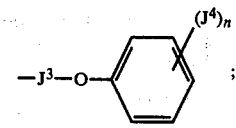

and n represents an integer of 1 to 5 (preferably 1 or 2).

Specific examples of the sulfamoyl group represented by the formula (A) are illustrated below.

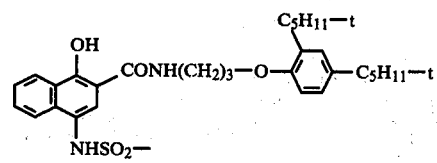

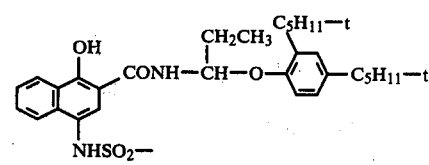

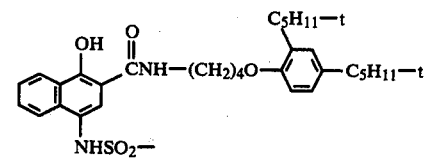

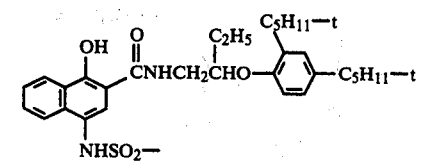

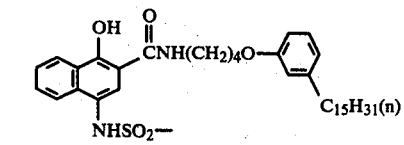

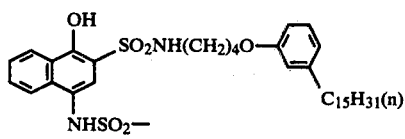
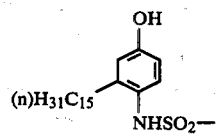
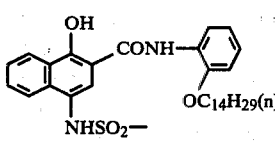
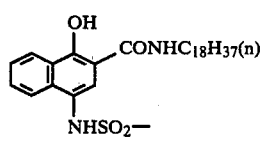
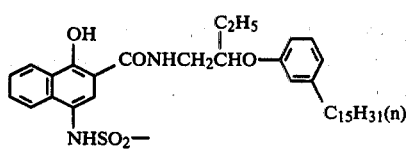
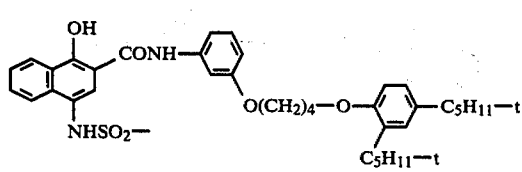
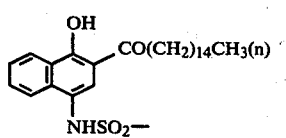
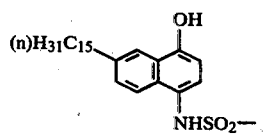
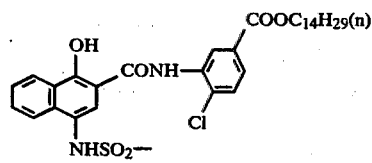
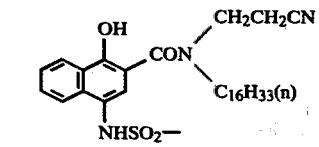
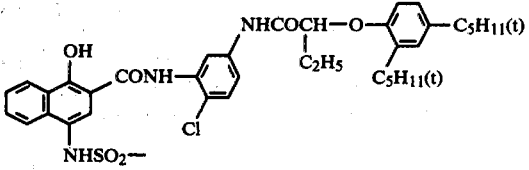
Specific examples of the sulfamoyl group represented by the formula (B) are illustrated below.
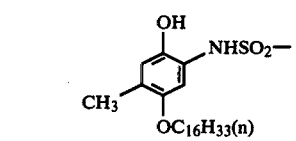
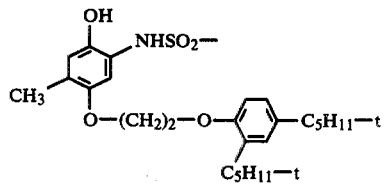
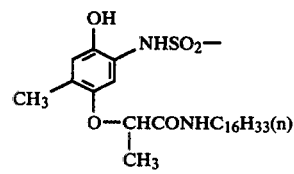
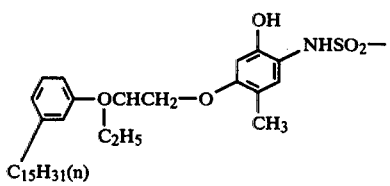
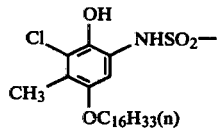
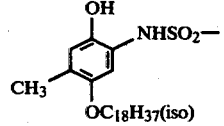
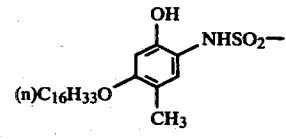
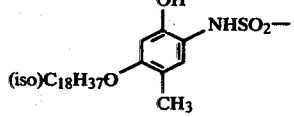

-continued

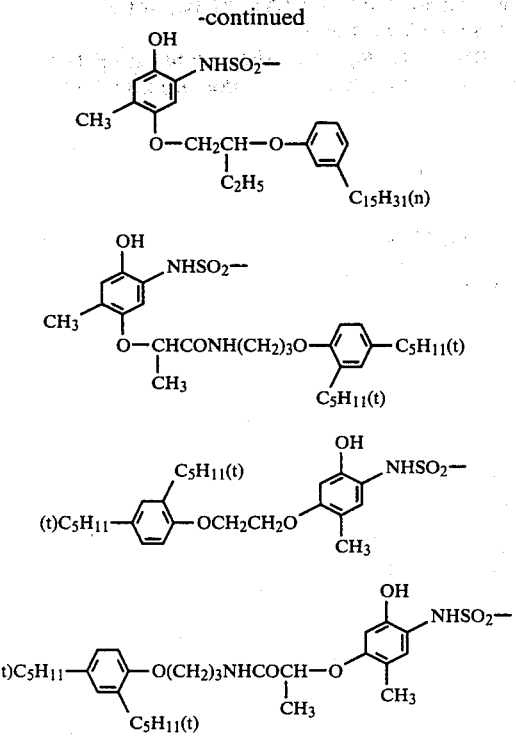

Furthermore, the groups described in U.S. Pat. No. 4,135,929 and Research Disclosure, Vol. 130, No. 13024 (February 1975) are also effective for the moiety Y.

Specific examples of the moiety Y represented by the formula (D) are illustrated below.

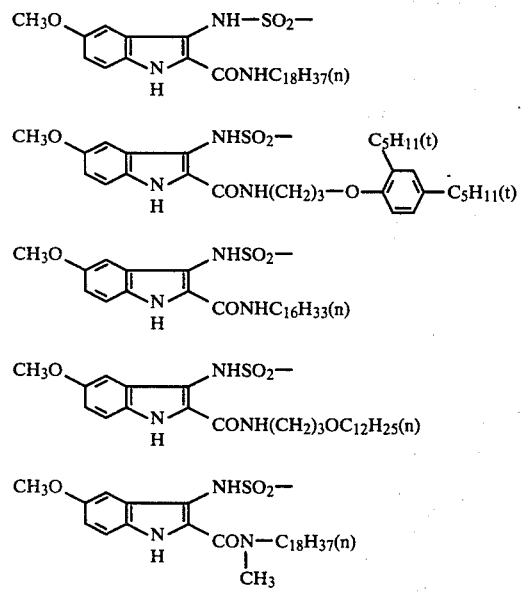

More preferred compounds of the present invention are those represented by the foregoing general formula (I) or (II) in which $R^1$ represents $-CH_2CH_2-$, $R^2$ represents a straight or branched chain alkyl group containing 1 to 4 carbon atoms (e.g., a methyl group, an ethyl group, an n-propyl group, an isopropyl group or an n-butyl group), $B_1$ and $B_2$ may be the same or different and each represents a straight or branched chain alkyl group containing 1 to 4 carbon atoms (e.g., a methyl group, an ethyl group, an n-propyl group or an n-butyl group), or a straight or branched chain substituted alkyl group containing 1 to 4 carbon atoms in the alkyl moiety (examples of suitable substituents being a cyano group, an alkoxy group containing 1 or 2 carbon atoms, a hydroxy group, a carboxy group, a sulfo group, a halogen atom (e.g., fluorine, chlorine, bromine and iodine), a sulfamoyl group of the formula $SO_2NR^4R^5$, a carbamoyl group of the formula $-CONR^4R^5$, a sulfonamido group of the formula $-NHSO_2R^3$, and a carbonamido group of the formula $-NHCOR^3$), $D_1$ and $D_2$ may be the same or different and each represents a hydrogen atom, a straight or branched chain unsubstituted alkyl group containing 1 to 4 carbon atoms (e.g., a methyl group, an ethyl group, an n-propyl group or an n-butyl group), an alkoxy group containing 1 to 4 carbon atoms (e.g., a methoxy group or an ethoxy group), a substituted alkoxy group containing 1 to 4 carbon atoms, examples of the substituents include an alkoxy group containing 1 to 2 carbon atoms or a hydroxy group, or a halogen atom (e.g., fluorine, chlorine, bromine and iodine), $E_1$ and $E_2$ may be the same or different and each represents a hydrogen atom, a trifluoromethyl group, a straight or branched chain unsubstituted alkyl group containing 1 to 4 carbon atoms (e.g., a methyl group, an ethyl group, an n-propyl group, or an n-butyl group), a nitro group, a halogen atom (e.g., fluorine, chlorine, bromine and iodine), a sulfamoyl group represented by $-SO_2NR^4R^5$ (wherein $R^4$ and $R^5$ may be the same or different and each represents a hydrogen atom, an alkyl group containing 1 to 4 carbon atoms or a substituted alkyl group containing 1 to 4 carbon atoms in the alkyl moiety (examples of suitable substituents being a cyano group, an alkoxy group containing 1 to 4 carbon atoms, a hydroxy group, a carboxy group, a sulfo group, etc.), or $R^4$ and $R^5$ may combine directly or through an oxygen atom to form a 5- or 6-membered ring), or a carbamoyl group represented by $-CONR^4R^5$ (wherein $R_4$ and $R_5$ are defined as above), X represents $-T-C_6H_4-J-$, $-T-$arylene$-J-$ or $-T-$alkylene$-J-$ (wherein T represents a divalent group selected from a carboxy group, a carbonamido group, a sulfamoyl group, and a sulfonamido group, and J represents a divalent sulfonyl group or carbonyl group), $-SO_2-$ or $-CO-$ (further, where q=0 in the formula (II), compounds of n=p=0 being also preferred), Y represents a sulfamoyl group represented by the general formula (A), (B), (C) or (D), L represents a straight or branched chain alkylene group containing 1 to 4 carbon atoms (e.g., a methylene group, an ethylene group, an n-propylene group or an n-butylene group) or a phenylene group, q represents 0 or 1, and M represents a sulfamoyl group represented by $-SO_2NR^4R^5$ (wherein $R^4$ and $R^5$ are defined as above).

Particularly preferred compounds of the present invention are those represented by the foregoing formula (I) in which $R^1$ represents $-CH_2CH_2-$, $R^2$ represents a straight chain alkyl group containing 1 to 4 carbon atoms, $B_1$ and $B_2$ are the same or different and each represents a straight chain alkyl group containing 1 to 4 carbon atoms or a substituted straight chain alkyl group containing 1 to 4 carbon atoms in the alkyl moiety (suitable substituent being a hydroxy group, a halogen atom, a sulfamoyl group, a carbamoyl group, a sulfonamido group or a carbonamido group), $D_1$, $D_2$, $E_1$, and $E_2$ may be the same or different and each represents a hydrogen atom, a methyl group, an ethyl group, a methoxy group, an ethoxy group or a halogen atom, X represents —SO$_2$—, Y represents a sulfamoyl group represented by the general formula (A), (B), (C) or (D), and Z represents a hydrogen atom.

Specific examples of the dye-releasing redox compounds of the present invention are illustrated below.

Compound 1

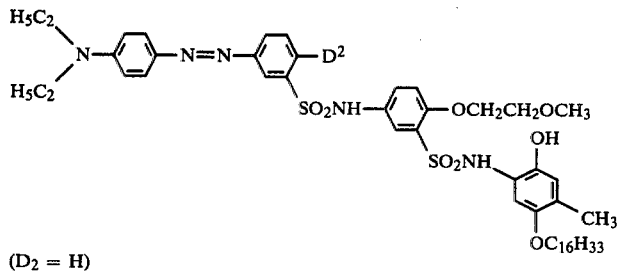

(D$^2$ = H)

D$^2$ = OCH$_3$ in Compound 1.

Compound 2

Compound 3

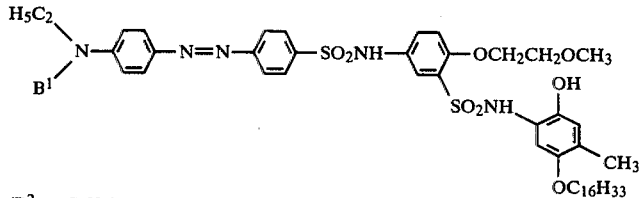

(B$^2$ = C$_2$H$_4$NHSO$_2$CH$_3$)

B$^2$ = C$_2$H$_5$ in Compound 3.

Compound 4

Compound 5

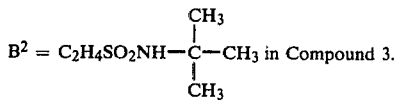

B$^2$ = C$_2$H$_4$SO$_2$NH—C(CH$_3$)$_2$—CH$_3$ in Compound 3.

Compound 6

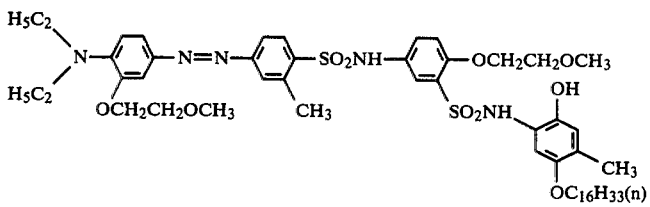

Compound 7

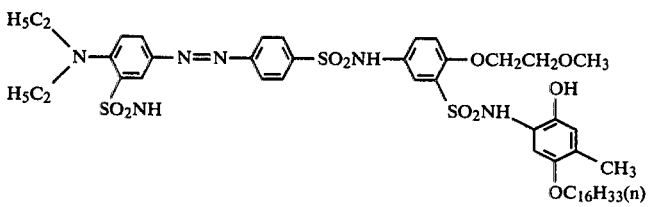

Compound 8

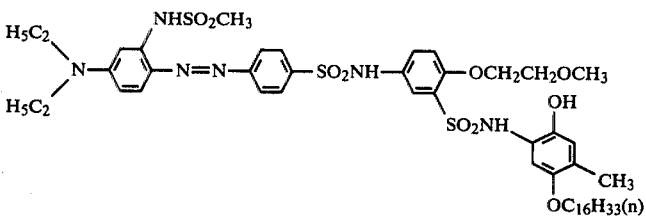

Compound 9

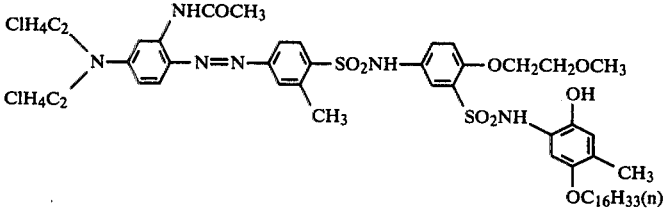

-continued
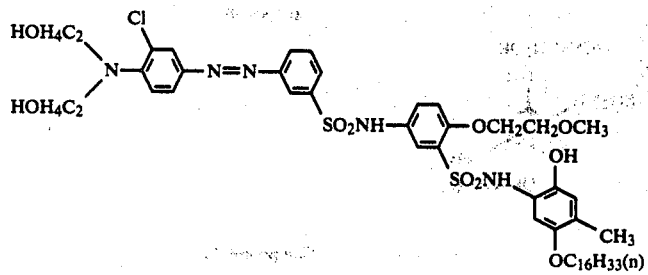
Compound 10
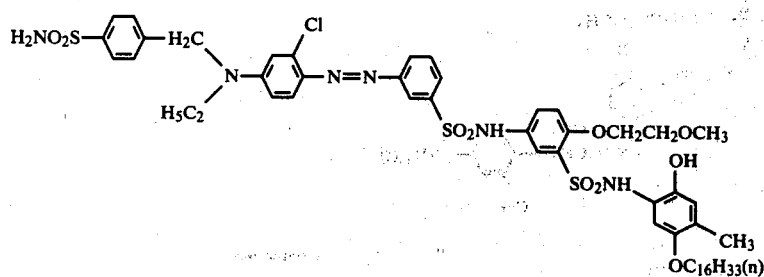
Compound 11
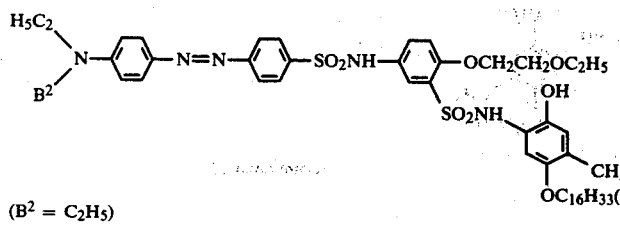
Compound 12
($B^2 = C_2H_5$)
$B^2 = C_2H_4NHSO_2CH_3$ in Compound 12.    Compound 13
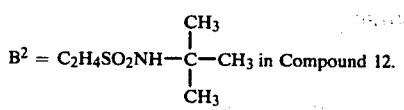    Compound 14
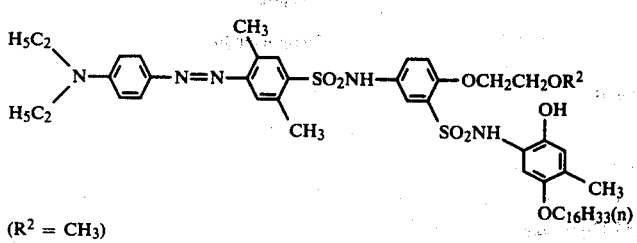    Compound 15
($R^2 = CH_3$)
$R^2 = C_2H_5$ in Compound 15.    Compound 16
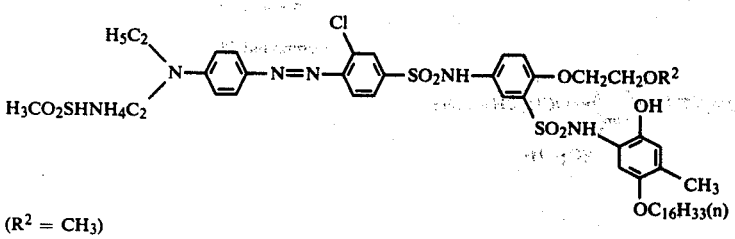    Compound 17
($R^2 = CH_3$)
$R^2 = C_2H_5$ in Compound 17.    Compound 18

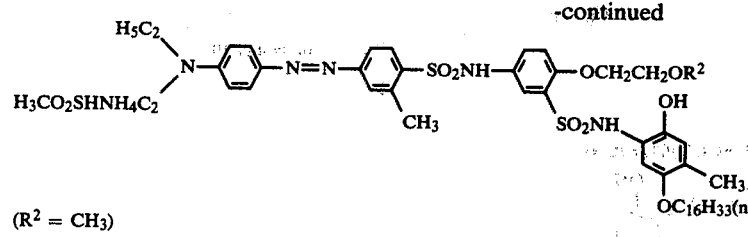
Compound 19
($R^2 = CH_3$)
$R^2 = C_2H_5$ in Compound 19.
Compound 20
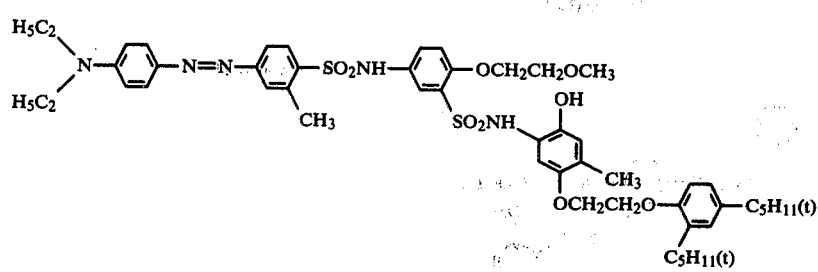
Compound 21
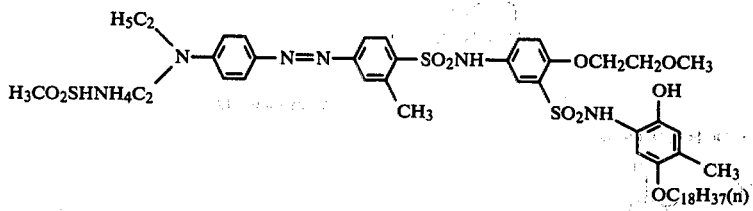
Compound 22
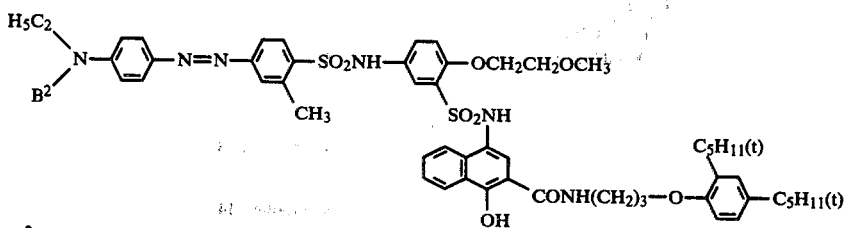
Compound 23
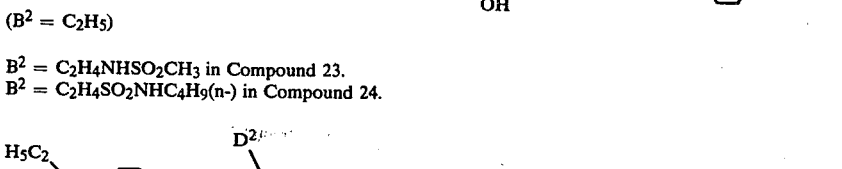
($B^2 = C_2H_5$)
$B^2 = C_2H_4NHSO_2CH_3$ in Compound 23.
$B^2 = C_2H_4SO_2NHC_4H_9(n-)$ in Compound 24.
Compound 24
Compound 25
Compound 26
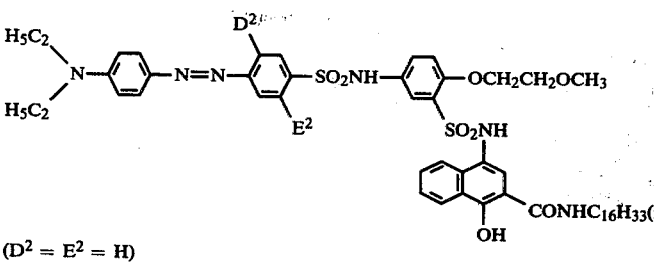
($D^2 = E^2 = H$)
$D^2 = H$ and $E^2 = CH_3$ in Compound 26.
$D^2 = E^2 = CH_3$ in Compound 26.
Compound 27
Compound 28
Compound 29
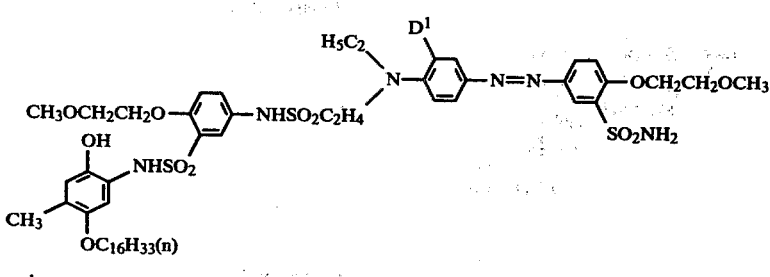
($D^1 = H$)

$D^1 = Cl$ in Compound 29.

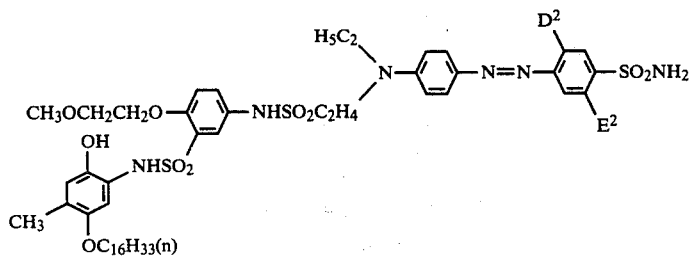

($D^2 = E^2 = H$)                          Compound 30

$D^2 = Cl$ and $E^2 = H$ in Compound 31.   Compound 31
$D^2 = H$ and $E^2 = CH_3$ in Compound 31. Compound 32
$D^2 = E^2 = CH_3$ in Compound 31.         Compound 33
                                           Compound 34

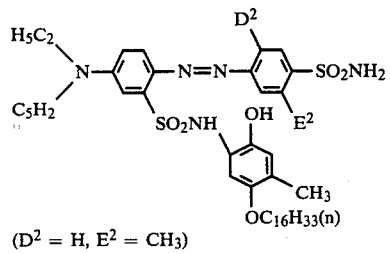

Compound 35

($D^2 = H, E^2 = CH_3$)

$D^2 = E^2 = CH_3$ in Compound 35.         Compound 36
$D^2 = Cl$ and $E^2 = H$ in Compound 35.   Compound 37

When oxidized under alkaline conditions, the compounds of the present invention release a novel yellow dye compound represented by the following formula (III) or (IV):

reaction of a sulfonyl halide or a carbonyl halide represented by (V) and an amine represented by (VI):

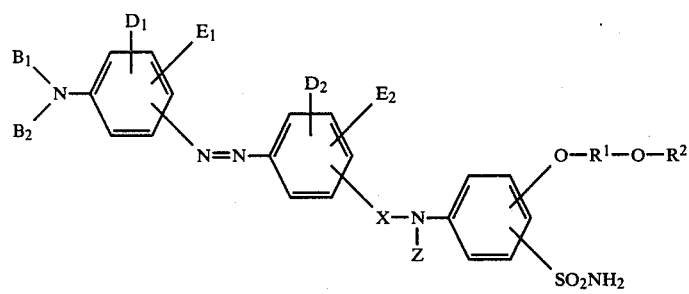

(III)

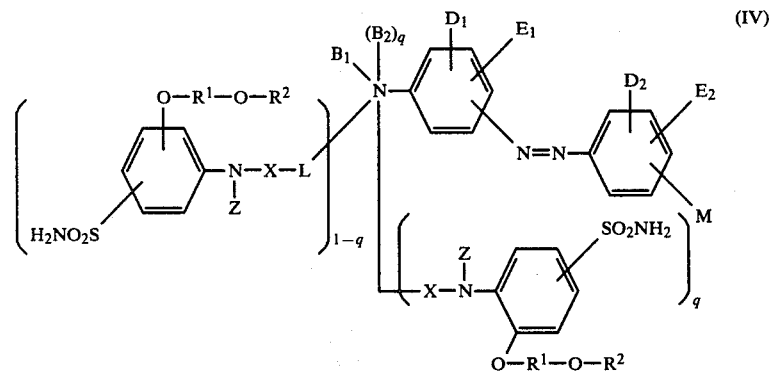

(IV)

wherein $B_1$, $B_2$, $D_1$, $D_2$, $E_1$, $E_2$, X, Z, $R^1$, $R^2$, L, M and q are the same as defined with formula (I) or (II).

The compounds of the present invention represented by the formula (I) can be obtained by condensation

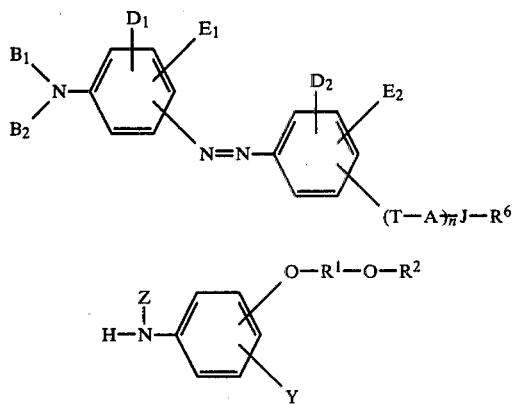

(V)

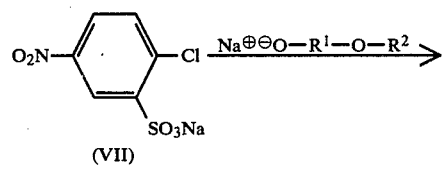 (VI)

wherein $B_1$, $B_2$, $D_1$, $D_2$, $E_1$, $E_2$, T, A, n, J, $R^1$, $R^2$, Y and Z are the same as defined with formula (I), and $R^6$ represents a halogen atom (for example, a chlorina atom or a bromine atom).

This condensation reaction is usually conducted in the presence of a basic material. As the examples of such basic materials, there are illustrated alkali metal or alkaline earth metal hydroxides (for example, sodium hydroxide, potassium hydroxide, calcium hydroxide, etc.), aliphatic amines (for example, triethylamine, etc.), aromatic amines (for example, N,N-diethylamine, etc.), heteroaromatic amines (for example, pyridine, quinoline, α-, β- or γ-picoline, lutidine, collidine, 4-(N,N-dimethylamino)pyridine, etc.), and hetero ring bases (for example, 1,5-diazabicyclo[4,3,0]nonene-5, 1,8-diazabicyclo[5,4,0]undecene-7, etc.). Where $R^6$ represents a chlorine atom and J=SO$_2$, i.e., where (V) represents a sulfonyl chloride, hetero aromatic amines are particularly excellent among the above-described bases.

The sulfonyl halide represented by the formula (V) is obtained by halogenating a corresponding sulfonic acid or salt thereof. From the point of view of reactivity and synthesis ease, sulfonyl chlorides wherein $R^6$ represents a chlorine atom are particularly excellent.

Examples of the sulfonyl halide represented by the formula (V) are described in Japanese Patent Application (OPI) Nos. 33826/73, 7727/77, 126331/74, 115528/75, 114424/74, U.S. Pat. Nos. 3,932,380, 3,931,144, etc.

As a typical process for synthesizing the amine represented by the formula (VI) (Z=H), there is the route illustrated below.

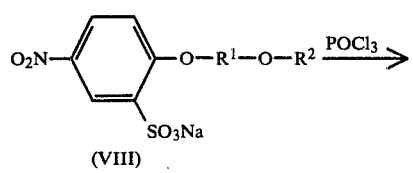

(VII)

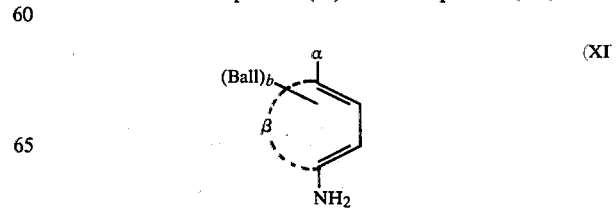

(VIII)

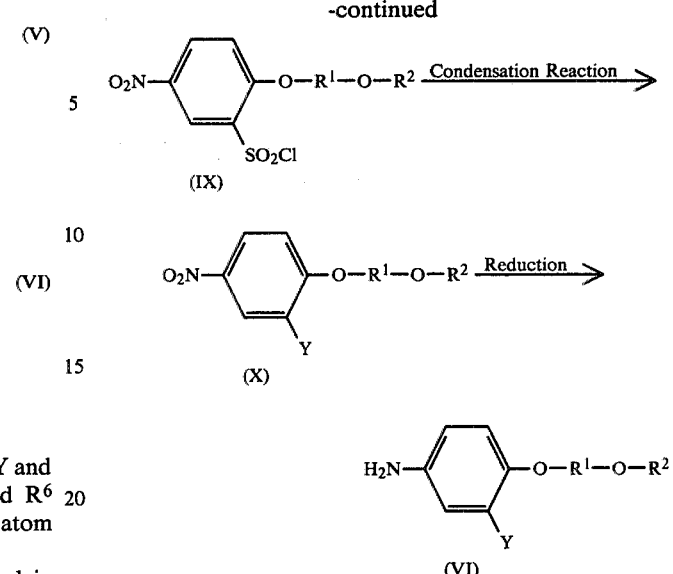

The first step in this process is the reaction between the compound of the formula (VII) and $R^2$-O-$R^1$-O$^\ominus$, with the latter being obtained by treating an alcohol of $R^2$-O-$R^1$-OH with metallic sodium or sodium hydride. The metallic sodium or sodium hydride is used in the amount of about 1.5 mols per mol of the compound (VII). The reaction for obtaining the compound of the formula (VIII) is preferably conducted using excess $R^2$-O-$R^1$-OH as a solvent, and the temperature for said reaction is preferably below 80° C. As an alternative process for obtaining the compound (VIII), compound (VII) can be suspended in $R^2$-O-$R^1$-OH (used as a solvent) and reacted with sodium hydroxide in the presence of manganese oxide or sodium silicate (Na$_2$O.nSiO$_2$; n=about 1 to about 3). This procedure is superior because no ignitable materials like metallic sodium or sodium hydride are used.

In converting the compound of the formula (VIII) to the compound of the formula (IX), it is preferred to use phosphorus oxychloride (POCl$_3$), thionyl chloride (SOCl$_2$) or phosphorus pentachloride as a chlorinating agent. This chlorination is preferably conducted in the presence of N,N-dimethylacetamide, N,N-dimethylformamide or N-methylpyrrolidone in the presence of solvents such as acetone, acetonitrile, benzene or toluene.

The sulfonyl chloride represented by the formula (IX) is condensed with an amine represented by the formulae (XI), (XII), (XIII) or (XIV) to obtain a compound of the formula (X). This condensation reaction is desirably effected in the presence of a basic material as described above with respect to the condensation reaction between compound (V) and compound (VI).

(XI

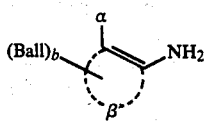

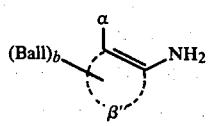

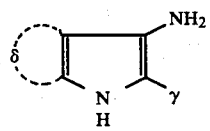

In the above formulae, α,β,β', β'', δ, γ, and b are the same as defined with formulae (A), (B), (C) or (D). Typical examples of the amine represented by the formula (XI) are described in Japanese Patent Application (OPI) No. 50736/78, U.S. Pat. Nos. 3,928,312, 3,993,638, 4,076,529 and 4,152,153, and typical examples of the amine represented by the formula (XII) are described in U.S. Pat. Nos. 4,053,312 and 4,055,428. Also, typical examples of the amine represented by the formula (XIII) are described in Japanese Patent Application (OPI) No. 104343/76, and typical examples of the amine represented by the formula (XIV) are described in Japanese Patent Application (OPI) No. 3819/78.

Typical examples of the reduction reaction for obtaining the compound of the formula (VI) include catalytic hydrogenation (Raney nickel, palladium-carbon or active carbon catalyst), a reduction with iron dust, a hydrazine reduction, etc. With respect to the compound (VI), it must be emphasized that the basicity of the amino group is increased by the presence of $R^2$—O—$R^1$—O—. This increased basicity provides the advantage that the subsequent condensation reaction with the sulfonyl halide (V) easily proceeds. It will be apparent that, in the above-described route for preparation of the sulfonyl halide of the formula (V), the use of potassium 3-nitro-4-chlorobenzenesulfonate in place of (VII) provides compounds different in substitution position.

Also, the compound of the formula (II) can be obtained by condensation of a sulfonyl halide or carboxyl halide represented by the formula (XV) and the amine represented by the formula (VI), or between a sulfonyl halide of the formula (XVI) and the amine represented by the formula (XI), (XII), (XIII) or (XIV). This condensation reaction may be conducted in the same manner as with the condensation reaction of the compound of (V) and the compound of (VI).

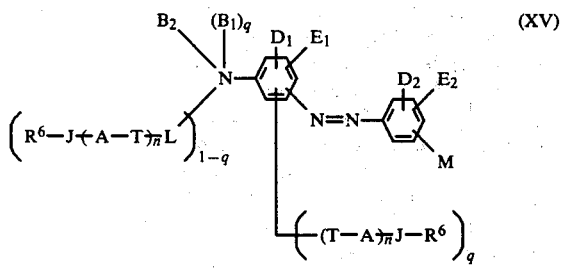

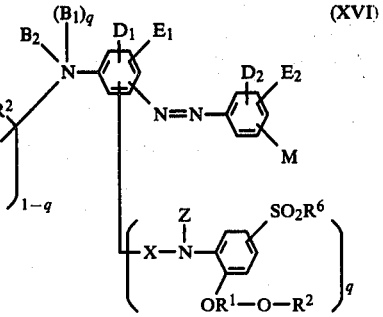

In the above formulae, $B_1$, $B_2$, $D_1$, $D_2$, $E_1$, $E_2$, M, L, T, A, Z, n, q, J, $R^1$, $R^2$ and Z are defined as in the formula (II), and $R^6$ is defined as in the formula (V).

Typical synthesis examples for synthesizing the dye-providing compounds of the present invention and the intermediates therefor are described in detail below.

SYNTHESIS EXAMPLE 1

Synthesis of Sodium 2-(2-Methoxyethoxy)-5-Nitrobenzenesulfonate (Process 1)

55 g of sodium 2-chloro-5-nitrobenzenesulfonate was added to a sodium 2-methoxyethylate solution prepared by adding 7.3 g of sodium hydride (14.6 g in the form of 50% liquid paraffin suspension) to 300 ml of methyl cellosolve. The reaction mixture was heated and stirred at 80° to 85° C. for 30 minutes on a warm water bath. After hot filtration, 1.5 liters of isopropyl alcohol was added to the mother liquor to crystallize. Crystals thus formed were collected by filtration and washed with 100 ml of isopropyl alcohol. Yield: 59 g; m.p. 238° to 239° C.

(Process 2)

5.2 g of sodium 2-chloro-5-nitrobenzenesulfonate, 0.6 g of manganese dioxide, 15 ml of methyl cellosolve, 1 ml of water, and 0.95 g of sodium hydroxide were mixed and stirred at 75° C. for 40 minutes. After cooling, insolubles were filtered, and the filtrate was poured into 100 ml of isopropyl alcohol. Crystals thus formed were collected by filtration to obtain 4.8 g of sodium 2-(2-methoxyethoxy)-5-nitrobenzenesulfonate. m.p. 238° to 239° C.

(Process 3)

In the same manner as with Process 2 except for using 0.8 g of sodium silicate (#3; $Na_2O.nSiO_2$; n=about 3) in place of manganese dioxide, there was obtained 4.8 g of sodium 2-(2-methoxyethoxy)-5-nitrobenzenesulfonate. (The same results were obtained when $Na_2O.nSiO_2$ (n=about 1, about 2 or about 2.5) was used.)

SYNTHESIS EXAMPLE 2

Synthesis of Sodium 2-(2-Ethoxyethoxy)-5-Nitrobenzenesulfonate 55 g of sodium 2-chloro-5-nitrobenzenesulfonate was added to a sodium 2-ethoxyethylate solution prepared by adding 7.3 g of sodium hydride (14.6 g in the form of a 50% liquid paraffin suspension) to 300 ml of ethyl cellosolve. This reaction mixture was stirred for 30 minutes while maintaining the temperature at 80° to 85° C. After completion of the reaction, insolubles were filtered off, and 150 ml of ethyl cellosolve was distilled out of the filtrate. 300 ml of isopropyl alcohol was added to the concentrate and cooled with ice. Crystals thus formed were collected by filtration, washed with 100 ml of isopropyl alcohol, and air-dried. Yield: 33 g; m.p. above 250° C.

SYNTHESIS EXAMPLE 3

Synthesis of Sodium 2-(2-Butoxyethoxy)-5-Nitrobenzenesulfonate

The above-identified compound was obtained in the same manner as in Synthesis Example 1 (Process 2) except for using ethylene glycol monobutyl ether in place of methyl cellosolve. Yield: 80%; m.p. above 250° C.

SYNTHESIS EXAMPLE 4

Synthesis of Compound 1

(a) Synthesis of 2-(2-Methoxyethoxy)-5-Nitrobenzenesulfonyl Chloride 59 g of sodium 2-(2-methoxyethoxy)-5-nitrobenzenesulfonate obtained in Synthesis Example 1 was added to 200 ml of acetone and 75 ml of phosphorus oxychloride. 75 ml of dimethylacetamide was added dropwise thereto under stirring, and the reaction mixture was maintained at 30° to 40° C. After the dropwise addition, the mixture was left under stirring until the temperature reached room temperature. Then, the reaction mixture was poured into 600 ml of ice-water, and stirred for 30 minutes. Crystals thus formed were collected by filtration, washed with 100 ml of water, and air-dried. Yield: 56 g; m.p. 71° to 72° C.

(b) Synthesis of 2-[2'-(2-methoxyethoxy)-5'-Nitrobenzenesulfonamido]-4-Hexadecyloxy-5-Methylphenol 20 g of 2-amino-4-hexadecyloxy-5-methylphenol hydrochloride and 18 g of 4-(2-methoxyethoxy)nitrobenzene-3-sulfonyl chloride obtained in above (a) were added to a mixture of 100 ml of tetrahydrofuran and 10 ml of pyridine, and stirred at room temperature for 3 hours. The reaction mixture was added to 300 ml of ice-water and 50 ml of concentrated hydrochloric acid under stirring. Crystals thus formed were collected by filtration and washed with water. After being air-dried, the crystals were recrystallized from 100 ml of acetonitrile. Yield: 35 g; m.p. 85.5° to 86° C.

(c) Synthesis of 2-[2'-(2-Methoxyethoxy)-5'-Aminobenzenesulfonamido]-4-Hexadecyloxy-5-Methylphenol 32 g of 2-[2'-(2-methoxyethoxy)nitrobenzenesulfonamido]-4-hexadecyloxy-5-methylphenol was added to 300 ml of isopropyl alcohol together with 24 g of iron dust, 12 g of tri-iron tetroxide, 0.6 g of ammonium chloride, and 25 ml of water, and refluxed for 1 hour on a steam bath under stirring. After completion of the stirring, the mixture was hot-filtered and, after cooling the mother liquor, crystals thus formed were collected by filtration, washed with 50 ml of isopropyl alcohol, and air-dried. Yield: 23 g; m.p. 142° to 144° C.

(d) Synthesis of Compound 1

40 ml of N,N-dimethylacetamide was added to 12.0 g of the above-described amine and 7.0 g of N,N-diethyl-4-(3-chlorosulfonylphenylazo)aniline and maintained at 20° C. 4 ml of pyridine was dropwise added to this solution and, after stirring at 20° C. for 4 hours, 120 ml of methanol was added thereto, followed by heating the solution to 60° C. Then, 30 ml of water was further added thereto, and the resulting solution was cooled to 20° C. under stirring. Crystals thus formed were collected by filtration and recrystallized from a mixture solvent of 50 ml of N,N-dimethylacetamide and 100 ml of methanol. Yield: 12.0 g; m.p. 93° to 95° C.

SYNTHESIS EXAMPLE 5

Synthesis of Compound 3

50 ml of N,N-dimethylacetamide was added to 9.3 g of the compound obtained in Synthesis Example 4 (c) and 7.0 g of N-ethyl-N-(2-methanesulfonamidoethyl)-4-(4-chlorosulfonylphenylazo)aniline, and maintained at 20° C. 3.7 ml of pyridine was added dropwise to this solution and, after being stirred at 20° C. for 4 hours, the solution was poured into 300 ml of ice-water. Crystals thus formed were collected by filtration, and column-purified using a methanol/chloroform (1/1) mixture solvent. Yield: 6.0 g; m.p. 75° to 78° C.

In subtractive color reproductions, light-sensitive elements comprising at least two combinations of a silver halide emulsion having a selective spectral sensitivity in some special range and a compound capable of forming a dye having a selective spectral absorption in the same spectral range can be used. Particularly, those light-sensitive elements are useful which comprise a combination of a blue-sensitive silver halide emulsion and a yellow dye-providing compound, a combination of a green-sensitive silver halide emulsion and a magenta dye-providing compound, and a combination of a red-sensitive silver halide emulsion and a cyan dye-providing compound. Needless to say, the dye-providing compounds of the present invention can be used as the above-described dye-providing compounds. With respect to each combination of the emulsion and the dye-providing compound, silver halide emulsion layer and dye-providing compound-containing layer can be in a face to face relationship in the light-sensitive elements, or silver halide and the dye-providing compound can be coated as a mixture in the form of particles thereof as one layer using a binder.

In a preferred embodiment of a superposed relationship, a blue-sensitive emulsion, a green-sensitive emulsion, and a red-sensitive emulsion are arranged from the side of exposure, in order, and particularly in case of using a high speed silver halide emulsion containing silver iodide, a yellow filter layer can be advantageously provided between the blue-sensitive emulsion layer and the green-sensitive emulsion layer. The yellow filter contains a yellow colloidal silver dispersion, a dispersion of an oil-soluble yellow dye, an acidic dye mordanted in a basic polymer of a basic dye mordanted in an acidic polymer. It is advantageous that the emulsion layers be separated by an interlayer which prevents undesirable interactions between the emulsion layers having different spectral sensitivites. The interlayer is constituted by a hydrophilic polymer such as gelatin, polyacrylamide or partially hydrolyzed polyvinyl acetate, a polymer having pores formed by the latex of a hydrophilic polymer and a hydrophobic polymer as disclosed in U.S. Pat. No. 3,625,685, or a polymer such as calcium alginate, of which the hydrophilic property is gradually increased by the processing composition as disclosed in U.S. Pat. No. 3,384,483.

A silver halide emulsion used in the invention is a hydrophilic colloid dispersion of a silver halide such as silver chloride, silver bromide, silver chlorobromide, silver iodobromide, silver chloroiodobromide or mixtures thereof, and the halide ratio in the emulsion can be widely selected depending upon the end use of the light-sensitive materials and the processing conditions employed. A silver iodobromide emulsion or silver chloroiodobromide emulsion which contains about 1 to 10 mol% of iodide (30 mol% or less of chloride), and the remaining amount of bromide is preferred. The particle size of silver halide can be that conventionally employed or a fine particle size, preferably a size ranging from about 0.1 to about 2 microns. In some cases, a uniform particle size is often desired. The crystal shape of silver halide can be cubic, octahedral or mixture of shapes. These silver halide emulsions can be prepared using conventional preparation methods, for example, as disclosed in P. Glafkides, *Chimie Photographique*, 2nd Edition, Chapters 18 to 23, Paul Montel, Paris (1957).

It is preferred that the silver halide emulsion to be used in the invention be chemically sensitized, e.g., with the natural chemical sensitizers contained in gelatin, a sulfur sensitizer such as sodium thiosulfate or N,N,N'-triethylthiourea, a gold sensitizer such as aurous thiocyanate complex salt or aurous thiosulfate complex salt, a reducing sensitizer such as stannous chloride or hexamethylenetetramine under heating. Those silver halide emulsions capable of forming latent images on the surface of grains and silver halide emulsions capable of forming latent images in the inner portions of the grains as disclosed in U.S. Pat. Nos. 2,592,550 and 3,206,313, and, in addition, direct positive emulsions can be utilized in the invention.

The silver halide emulsion used in the invention can be stabilized with additives such as 4-hydroxy-6-methyl-1,3,3a,7-tetrazaindene, 5-nitroimidazole, 1-phenyl-5-mercaptotetrazole, 8-chloromercuryquinoline, benzenesulfinic acid, pyrocatechin, 4-methyl-3-sulfoethylazolidine-2-thione or 4-phenyl-3-sulfoethylthiazolidine. In addition to the above additives, inorganic compounds such as cadmium salts, mercury salts or complex salts of metals belonging to the platinum group of the Periodic Table such as palladium chloride complex salt can be advantageously used as the stabilizer. The silver halide emulsion in the invention can contain a sensitizing compound such as a polyethylene oxide.

The spectral sensitivity of the silver halide emulsion used in the invention can be increased with a spectral sensitizing dye, if desired. Useful spectral sensitizers are cyanine dyes, merocyanine dyes, holopolar cyanine dyes, styryl dyes, hemicyanine dyes, oxonol dyes and hemioxonol dyes. Specific examples of the spectral sensitizers are disclosed in the above-described *Chimie Photographique*, Chapters 35 to 41, and F. M. Hamer, *The Cyanine Dyes and Related Compounds* (Interscience). The cyanine dyes in which a nitrogen atom of the basic heterocyclic ring nuclei is substituted with an aliphatic group (e.g., an alkyl group) having a hydroxyl group, a carboxyl group or a sulfo group, as disclosed in U.S. Pat. Nos. 2,503,776, 3,459,553, and 3,177,210 are particularly useful in the invention.

The dye-providing compounds used in the present invention can be dispersed in a carrier of hydrophilic colloid using various techniques according to the type of the compound. For example, compounds having a dissociative group such as a sulfo group or a carboxy group can be added to a hydrophilic colloid solution after being dissolved in water or an alkaline aqueous solution. Dye-providing compounds slightly soluble in an aqueous medium and readily soluble in an organic solvent are first dissolved in an organic solvent, and the resulting solution is added to a hydrophilic colloid solution, followed by stirring or the like to disperse the fine particles. Details of such dispersing methods are described in U.S. Pat. Nos. 2,322,027, 2,801,171, 2,949,360 and 3,396,027.

In order to stabilize dispersions of the dye-providing compound and accelerate dye image formation, incorporation of the dye-providing compound in a photographic element by dissolving in a solvent substantially insoluble in water and exhibiting a boiling point of about 200° C. or above under ordinary pressure is advantageous. As the high-boiling solvents suited for this purpose, there are illustrated aliphatic esters such as higher fatty acid triglycerides, dioctyl adipate, etc.; phthalic acid esters such as di-n-butyl phthalate; phosphoric acid esters such as tri-o-cresyl phosphate, tri-n-hexyl phosphate, etc.; amides such as N,N-diethyllaurylamide; hydroxy compounds such as 2,4-di-n-amylphenol; and the like.

Further, incorporation of a polymer having affinity for a solvent in a photographic element together with the dye-providing compound is favorable for stabilizing dispersion of the dye-providing compound and accelerating the dye image-forming step. As the polymer having affinity for a solvent, there are illustrated shellac; phenol-formaldehyde condensate; poly-n-butyl acrylate; n-butyl acrylate-acrylic acid copolymer; n-butyl acrylate-styrene-methacrylamide terpolymer; etc. These polymers may be dispersed in a hydrophilic colloid after being dissolved in an organic solvent together with the dye-providing compound, or a hydrasol of said polymer prepared through emulsion polymerization or like means may be added to a hydrophilic colloid dispersion of the dye-providing compound. Dispersion of the dye-providing compound can generally be attained by applying a large shearing force. For example, a high-speed rotary mixer, a colloid mill, a high pressure milk homogenizer, a high pressure homogenizer described in British Pat. No. 1,304,264, ultrasonic wave emulsifying apparatus, and the like are useful. Dispersion of the dye-providing compound is remarkably aided by using a surfactant as an emulsifying aid. As the surfactant useful for the dispersion of dye-providing compound used in the present invention, there are illustrated anionic surfactants such as sodium triisopropylnaphthalenesulfonate, sodium dinonylnaphthalenesulfonate, sodium p-dodecylbenzenesulfonate, sodium dioctylsulfosuccinate, sodium cetylsulfate, and those described in Japanese Patent Publication N0. 4293/64 and British Pat. No. 1,138,514. Combined use of these anionic surfactants and higher fatty acid esters of anhydrohexytol provides particularly good emulsifying ability as described in U.S. Pat. No. 3,676,141. Further, dispersing methods disclosed in Japanese Patent Publication No. 13837/68, U.S. Pat. Nos. 2,992,104, 3,044,873, 3,061,428, 3,832,173, etc., are also effective for dispersing the compounds of the present invention.

The processing solution-permeable layers such as silver halide emulsion layers to be used in the present invention, dye-providing compound-containing layers, and auxiliary layers (e.g., protective layer or interlayer) contain a hydrophilic polymer as a binder.

As the polymer, gelatin is advantageously used, and other hydrophilic polymers are also usable.

For example, there can be used gelatin derivatives; graft polymers between gelatin and other high polymer; proteins such as albumin, casein, etc.; cellulose derivatives such as hydroxyethyl cellulose, carboxymethyl cellulose, cellulose sulfate, etc.; sugar derivatives such as sodium alginate, starch derivative, etc.; and various synthetic hydrophilic high molecular homo- or copolymers such as polyvinyl alcohol, partly acetallized polyvinyl acohol, poly-N-vinyl pyrrolidone, polyacrylic acid, polymethacrylic acid, polyacrylamide, polyvinyl imidazole, polyvinyl pyrazole, etc.

As gelatin, acid-processed gelatin or enzyme-processed gelatin as described in *Bull. Soc. Sci. Phot. Japan*, No. 16, p. 30 (1966) may be used as well as lime-processed gelatin. In addition, a hydrolyzed product of enzyme-decomposed product of gelatin is suitable as well. As the gelatin derivatives, there are used those obtained by reacting gelatin with various compounds such as an acid halide, acid anhydride, isocyanates, bromoacetic acid, alkanesiltones, vinylsulfonamides, maleinimide compounds, polyalkylene oxides, epoxy compounds, or the like. Specific examples thereof are described in U.S. Pat. Nos. 2,614,928, 3,132,945, 3,186,846, 3,312,553, British Pat. Nos. 861,414, 1,033,189, 1,005,784, Japanese Patent Publication No. 26845/67, etc.

As the aforesaid gelatin graft polymer, there are used those prepared by grafting to gelatin a homo- or copolymer of vinyl monomer such as acrylic acid, methacrylic acid, the ester or amide derivative thereof, acrylonitrile, styrene, or the like. Particularly, graft polymers with a polymer having some compatibility with gelatin, such as a polymer of acrylic acid, methacrylic acid, acrylamide, methacrylamide, hydroxyalkyl methacrylate, or the like are preferred. Examples of them are described in U.S. Pat. Nos. 2,763,625, 2,831,767, 2,956,884, etc.

Typical synthetic hydrophilic high molecular materials are those described in, for example, West German patent application (OLS) No. 2,312,708, U.S. Pat. Nos. 3,620,751, 3,879,205, and Japanese Patent Publication No. 7561/68.

The silver halide emulsion layers, dye-providing compound-containing layers, and other hydrophilic colloidal layers used in the photographic light-sensitive sheet of the present invention can contain a coating aid, organic or inorganic hardener, etc.

As the coating aid, those described in *Product Licensing Index* (PLI), Vol. 92, No. 9232, p. 108 (published in Feb., 1971) and *Research Disclosure*, Vol. 176, No. 17643, pp. 26–27, item of coating aid (published in Feb., 1978) can be used.

As the hardener, those described in PLI, Vol, 92, No. 9232, p. 108 and *Research Disclosure* (abbreviated as RD), Vol. 176, No. 17643, p. 26, item of Hardener can be used.

The light-sensitive sheet of the present invention is prepared by coating at least one light-sensitive silver halide photographic emulsion layer associated with the dye-releasing redox compound of the present invention directly or indirectly on a planar substance which does not undergo serious dimensional change during processing. Examples of such a support include those used for ordinary photographic light-sensitive materials, such as cellulose acetate film, polystyrene film, polyethylene phthalate film, polycarbonate film, etc. In addition, paper and laminated paper having a layer of water-impermeable polymer like polyethylene on the surface are also effective as the support.

Examples of the process for obtaining color diffusion transfer images using dye-providing compounds are described in U.S. Pat. Nos. 3,928,312, 3,931,144, 3,993,638, 4,076,529, 4,152,153, Belgian Pat. No. 788,268, etc. These processes may be employed in combination with the dye-providing compounds of the present invention.

As the examples of the process for obtaining color diffusion transfer images using the dye-releasing redox compound, there are illustrated a process involving the following steps:

(A) imagewise exposing a light-sensitive sheet comprising a support having provided thereon at least one light-sensitive silver halide emulsion layer (hereinafter referred to as light-sensitive element) associated with the dye-releasing redox compound of the present invention;

(B) spreading an alkaline processing solution on the above-described light-sensitive silver halide emulsion layer to develop each light-sensitive silver halide in the presence of a silver halide-developing agent;

(C) cross-oxidizing the dye-releasing redox compound with an oxidation product of the developing agent produced in proportion to the exposure amount;

(D) cleaving an oxidation product of said dye-releasing redox compound to release a diffusible dye; and p1 (E) imagewise diffusing the released dye to an image-receiving layer (in direct or indirect contact with the light-sensitive layer) to form a transferred image thereon.

In the above process, any silver halide-developing agent that can cross-oxidize the dye-releasing redox compound can be used. Such developing agent may be incorporated in an alkaline processing composition or in an appropriate layer of the light-sensitive element. Examples of the developing agent usable in the present invention include hydroquinones, aminophenols (e.g., N-methylaminophenol), pyrazolidones (e.g., phenidone, 1-phenyl-3-pyrazolidone, dimezone (1-phenyl-4,4-dimethyl-3-pyrazolidone), 1-phenyl-4-methyl-4-hydroxymethyl-3-pyrazolidone, etc.), phenylenediamines (e.g., N,N-diethyl-p-phenylenediamine, 3-methyl-N,N-diethyl-p-phenylenediamine, 3-methoxy-N-ethoxy-p-phenylenediamine, etc.), and the like.

Of these, black-and-white developing agents forming less stain in an image-receiving layer are generally more preferred than color developing agents such as phenylenediamines.

When the dye-providing compound, especially the dye-releasing redox compound, of the present invention is used, an ordinary emulsion forming a latent image on grain surface provides a negative transfer image and a positive image in the light-sensitive element in the absence of a reversal mechanism. Where the silver halide emulsion is a direct positive silver halide emulsion (including an emulsion which directly provides a reversal positive image when fogged during development processing after imagewise exposure, such as an emulsion being one which forms latent images inside the grains or solarization type emulsion), a positive image is obtained in the image-receiving position.

As the above-described solarization type emulsion, those described in *The Theory of the Photographic Process* (compiled by Mees), pp. 261–297 (published by Macmillan Co., New York, 1942) are useful. Processes for preparing the emulsion are described in, for example, British Pat. Nos. 443,245, 262,730, U.S. Pat. Nos. 2,005,837, 2,541,472, 3,367,778, 3,501,305, 3,501,306, and 3,501,307.

Emulsions forming a latent image inside silver halide grains which are advantageously used in the present invention are described in U.S. Pat. No. 2,592,250, etc. As the fogging agents for this type emulsion, hydrazines described in U.S. Pat. Nos. 2,588,982 and 2,563,785, hydrazides and hydrazone described in U.S. Pat. No. 3,227,552, and quaternary salt compounds described in British Pat. No. 1,283,835, Japanese Patent Publication No. 38164/74, U.S. Pat. Nos. 3,734,738, 3,719,494, 3,615,615, etc., are typical examples.

Further, DIR reversal emulsion processes as described in U.S. Pat. Nos. 3,227,551, 3,227,554 and 3,364,022 or reversal emulsion processes based on dissolution physical development as described in British Pat. No. 904,364 can be combined with the dye-providing compounds, particularly the dye-releasing redox compounds, of the present invention.

The image-receiving element used in combination with said light-sensitive element must have a mordant layer containing a poly-4-vinylpyridine latex (particularly in polyvinyl alcohol) as described in U.S. Pat. No. 3,148,061, polyvinyl pyrrolidone described in U.S. Pat. No. 3,003,872, or a polymer containing a quaternary ammonium salt as described in U.S. Pat. No. 3,239,337 independently or in combination. As the mordant, basic polymers described in U.S. Pat. Nos. 2,882,156, 3,625,694, 3,709,690, etc., are also effective. In addition, mordants described in U.S. Pat. Nos. 2,484,430, 3,271,147, 3,184,309, 3,271,147, etc., are also effective. The light-sensitive sheet of the present invention preferably possesses the function of neutralizing alkali brought thereinto from a processing composition. For this purpose, it is advantageous to provide in the light-sensitive sheet (for example, a cover sheet or image-receiving sheet) a neutralizing layer containing an acidic substance in a coverage sufficient to neutralize the alkali contained in the processing solution, that is, in an area concentration equivalent to or more than the amount of alkali contained in the spread processing solution. As a method of using a cover sheet containing the neutralizing layer, it is also effective to apply the layer to a delaminated image-receiving element. Preferred acidic substances are described in U.S. Pat. Nos. 2,983,606, 2,584,030, 3,362,819, etc. In addition to these acidic substances, the neutralizing layer can contain a polymer such as cellulose nitrate, polyvinyl acetate, or the like and can contain a plasticizer as described in U.S. Pat. No. 3,557,237. As is described in West German Patent Application (OLS) No. 2,038,254, the acidic substance may be microencapsulated to be incorporated in the light-sensitive sheet.

The neutralizing layer (or the acidic substance-containing layer) used in the present invention is desirably spaced from the spread processing solution layer by a neutralization rate-controlling layer (timing layer). Examples of materials for the timing layer are gelatin, polyvinyl alcohol, and compounds described in U.S. Pat. Nos. 3,455,686, 4,009,030, 3,785,815, Japanese Patent Application Nos. 77946/73, 90616/75, Japanese Patent Application (OPI) Nos. 92022/73, 64435/74, 22935/74, 77333/76, Japanese Patent Publication Nos. 15756/69, 12676/71, 41214/73, West German Patent Application (OLS). Nos. 1,622,936, 2,162,277, *Research Disclosure*, Vol. 151, 15162 (1976), etc. This timing layer functions to delay a reduction in the pH of the processing solution by the neutralizing layer, thus serving to ensure sufficient progress of development and transfer.

In a preferred embodiment of the invention, the image-receiving element is composed of a support, a neutralizing layer, a timing layer, and a mordant layer (image-receiving layer), in a superposed relationship. Details of this image-receiving element are described in Japanese Patent Application (OPI) No. 13285/72, U.S. Pat. No. 3,295,970, British Pat. No. 1,187,502, etc.

The processing composition used in the invention is a liquid composition containing the processing components necessary for development of the silver halide emulsion and for formation of diffusion transfer dye images. A major portion of the solvent of the processing solution is water and in some cases a hydrophilic solvent such as methanol or methyl cellosolve is present. The processing composition contains an alkali in the amount sufficient to maintain the pH necessary for developing the emulsion layer and to neutralize the acid generated in the steps of development and formation of color dye images (the acid generated can be a hydrohalogenic acid such as hydrobromic acid, or a carboxylic acid such as acetic acid). As the alkali, there are used lithium hydroxide, sodium hydroxide, potassium hydroxide, a calcium hydroxide dispersion, tetramethylammonium hydroxide, sodium carbonate, trisodium phosphate, diethylamine, and other ammonium salts, alkali metal salts, alkaline earth metal salts and amines. It is desirable to incorporate the caustic alkali in such a concentration that the pH is above about 12, particularly preferably 14, at room temperature.

Preferably the processing composition contains a hydrophilic polymer such as polyvinyl alcohol, hydroxyethyl cellulose or sodium carboxymethyl cellulose. These polymers impart a viscosity of more than 1 poise, preferably several hundred (500 to 600) poises to 1,000 poises to the processing composition which not only facilitates uniform spreading but also form a non-fluid film upon concentration of the processing composition due to the migration of the aqueous solvent into the light-sensitive element and the image-receiving element in the course of the processing, and thus serve to unify the film unit after processing. In addition, this polymer film can serve, after the substantial completion of the formation of diffusion transferred dye images, to control further migration of the coloring ingredients into the image-receiving layer, thereby preventing the image from being changed.

In some cases, the processing composition advantageously contains a light absorbent such as titanium dioxide, carbon black, a pH-indicating dye, etc., and a desensitizer as described in U.S. Pat. No. 3,579,333 so as to prevent the silver halide emulsion from being fogged by the light from outside during processing. Furthermore, a development inhibitor like benzotriazole may be added to the processing composition.

The above-described processing composition is preferably retained in a rupturable container as described in U.S. Pat. Nos. 2,543,181, 2,643,886, 2,653,732, 2,723,051, 3,056,491, 3,056,492, 3,152,515, etc.

Where the photographic light-sensitive sheet of the present invention is used in the form of a photographic film unit which is constituted so that it can be processed by passing through a pair of juxtaposed pressure-applying members after imagewise exposure, it contains, for example, the following elements:

(1) a support;
(2) a light-sensitive element;

(3) an image-receiving element;
(4) a processing element; and
(5) a developing agent (in the processing element or the light-sensitive element).

In one embodiment of the aforesaid film unit, the light-sensitive element and the image-receiving element are superposed in face-to-face relationship and, after exposure, an alkaline processing composition is spread therebetween to process the film unit. On this occasion, the image-receiving element may be delaminated after transfer of the image, or the image-receiving element may be designed to permit the image to be viewed without delamination as described in U.S. Pat. No. 3,415,645.

In another embodiment, the image-receiving element and the light-sensitive element may be unified in this order and disposed on a support. For example, as disclosed in Belgian Pat. No. 757,960, a film unit comprising a transparent support having coated thereon, in order, an image-receiving layer, a substantially opaque light-reflecting layer (for example, a $TiO_2$ layer or a carbon black layer), and the aforesaid single or plural light-sensitive layers is effective. After imagewise exposure of the light-sensitive element, the unit is superposed in face-to-face relation on a processing sheet opaque enough to intercept light, and a processing composition is spread therebetween.

One embodiment of a superposed and unified film unit which is the most recommended in applying the present invention is disclosed in Belgian Pat. No. 757,959. According to this embodiment, an image-receiving layer, a substantially opaque reflecting layer, and the aforesaid single or plural light-sensitive layers are coated in sequence on a transparent support, then a transparent cover sheet is superposed thereon in face-to-face relation. A rupturable container retaining an alkaline processing composition containing an opacifying agent (e.g., carbon black) for intercepting light is positioned adjacent to the uppermost layer of the above-stated light-sensitive layers and the transparent cover sheet. Such a film unit is imagewise exposed through the transparent cover sheet and, upon removal from the camera, the container is ruptured by means of the pressure-applying members to spread the processing composition (containing an opacifying agent) uniformly between the light-sensitive layer and the cover sheet. Thus, the light-sensitive element is shielded from light in a sandwiched form, and development can proceed in a bright room.

It is recommended to incorporate a neutralizing mechanism in these film units as has been described before. Above all, it is preferred to provide a neutralizing layer in the cover sheet (if desired, a timing layer is provided on the side on which the processing solution is spread).

Another useful laminate-integrated film units which can be used with the photographic element of the present invention are described in U.S. Pat. Nos. 3,415,644, 3,415,645, 3,415,646, 3,647,487, 3,635,707 and 3,993,486, etc.

The effects and advantages of the present invention are described below.

First, the released dyes have good light resistance and color images suffering less photo-fading can be obtained.

Second, the hue of released dye is so good (pH-independent) that high quality color images can also be obtained when the dye-providing compounds are combined with other redox compound providing good hue.

Third, the released dye has such good transfer properties that the amount of dye remaining in the exposed portions of the light-sensitive element is extremely small, and if necessary, the light-sensitive element may be delaminated and subjected to a silver-removing processing to obtain a negative color image (useful as a negative) composed of unreacted dye-releasing redox compound.

The present invention will be illustrated in more detail by reference to the following examples. Unless otherwise indicated all parts, percents, etc., are by weight.

EXAMPLE 1

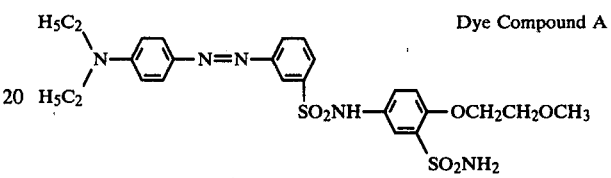

Dye Compound A 20 mg of Dye Compound A which is released from Compound 1 was dissolved in 5.0 ml of a 0.1 N sodium hydroxide aqueous solution. A mordant layer containing 3.0 g/m² of the following mordant was coated on a polyethylene terephthalate transparent support and cut into strips to prepare mordant strips.

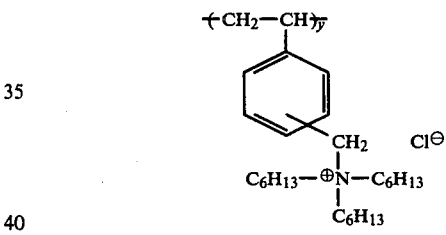

These strips were dipped in the above-described solution of Dye Compound A to immobilize it so that the absorbance at maximum absorption wavelength was about 0.5 to 1.0. Visible light absorption of the mordanted strips was measured when the strips were dipped in buffers with different pH. (FIG. 1).

In FIG. 1, the solid line shows the absorption spectrum measured at a pH of 6.86, and the broken line at a pH of 4.51. (The solid lines and broken lines in FIGS. 2 to 4 also refer to pH's of 6.86 and 4.51, respectively.)

Figure 2:
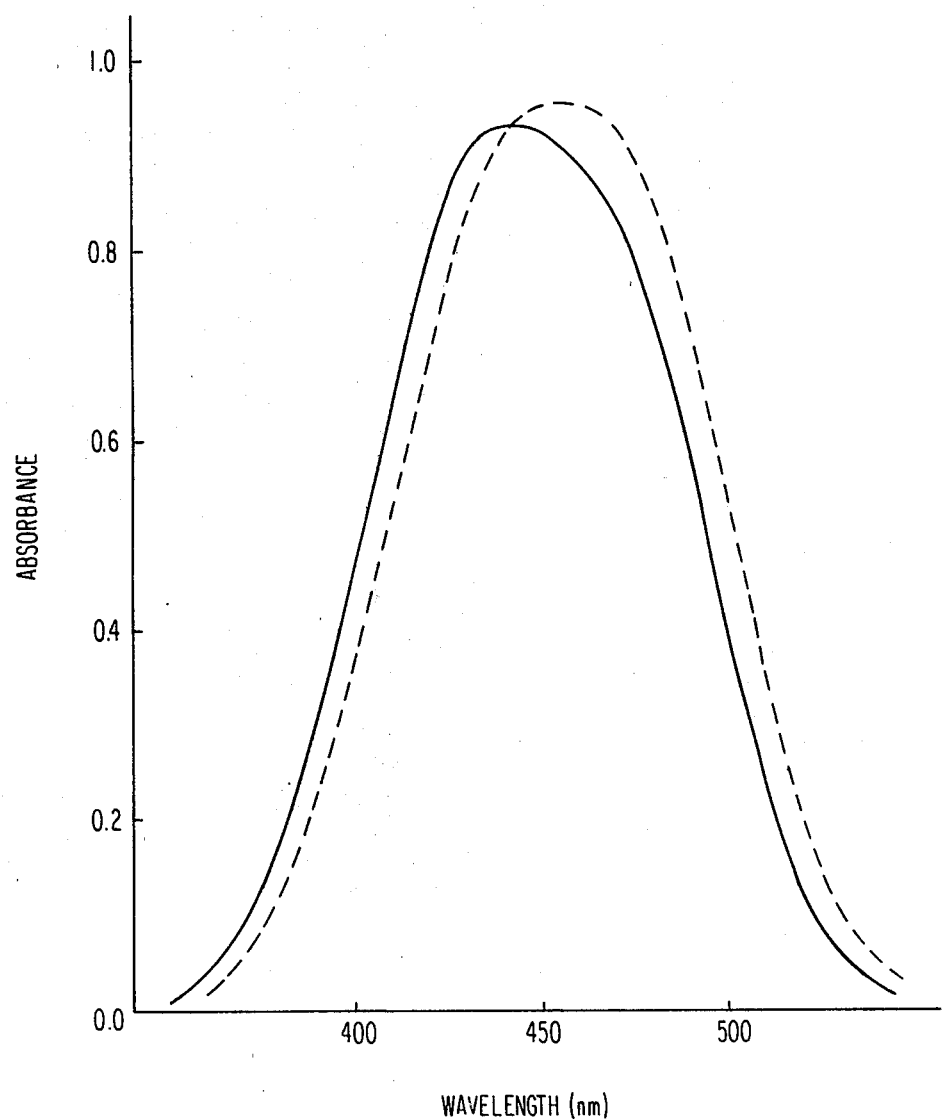
Figure 3:
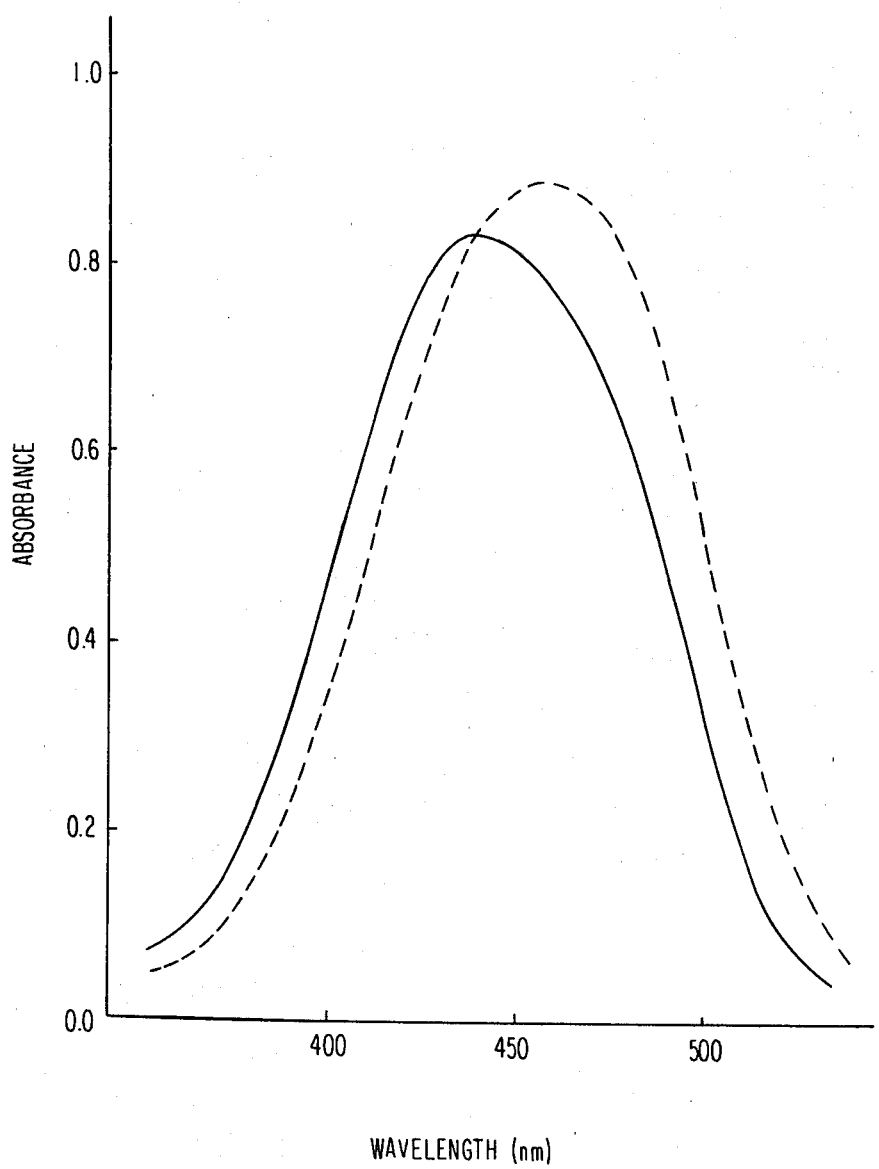

For comparison, the visible light absorption of Comparative Compounds B and C was measured in the same manner at various pH values. The results are shown in FIGS. 2 and 3, respectively.

Comparative Compound B: (within the scope of compounds described in Research Disclosure, Vol. 164, 16475 (published in Feb., 1977)

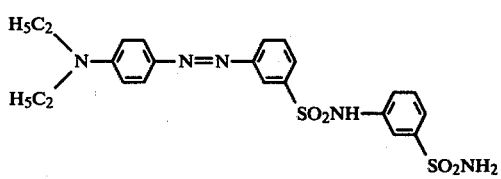

Comparative Compound C:

-continued

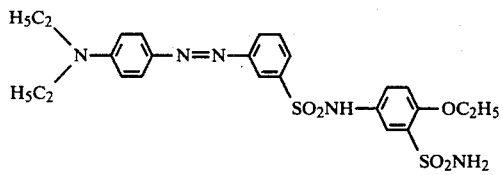

As is clear from FIG. 1, visible light absorption of Dye Compound A released from the compound of the present invention scarcely changes over the pH range of about 6.9 to about 4.5. In contrast, the visible light absorption of Comparative Compounds B and C were found to undergo serious change in pH between 6.86 and 4.51.

In diffusion transfer photographic film units, the pH value within the unit changes from a high level (about 10 or more) immediately after spreading the processing solution to a low level (about 5 or less) (as a function of the neutralizing mechanism). Therefore, those compounds which undergo serious changes in absorption over the above-described pH range like the Comparative Compounds B and C are not preferred. The compound of the present invention has the advantage that it scarcely undergoes a change in absorption over a wide pH range as demonstrated in Example 1.

The above-described differences between the effect of the $CH_3OCH_2CH_2O-$ group in Compound A and that of $C_2H_5O-$ group in the comparative compounds has not been disclosed nor recognized before. As described above, in the $R^2-O-R^1-O-$ group, the presence of the two oxygen atoms is considered important.

COMPARATIVE EXAMPLE 1

Figure 4:
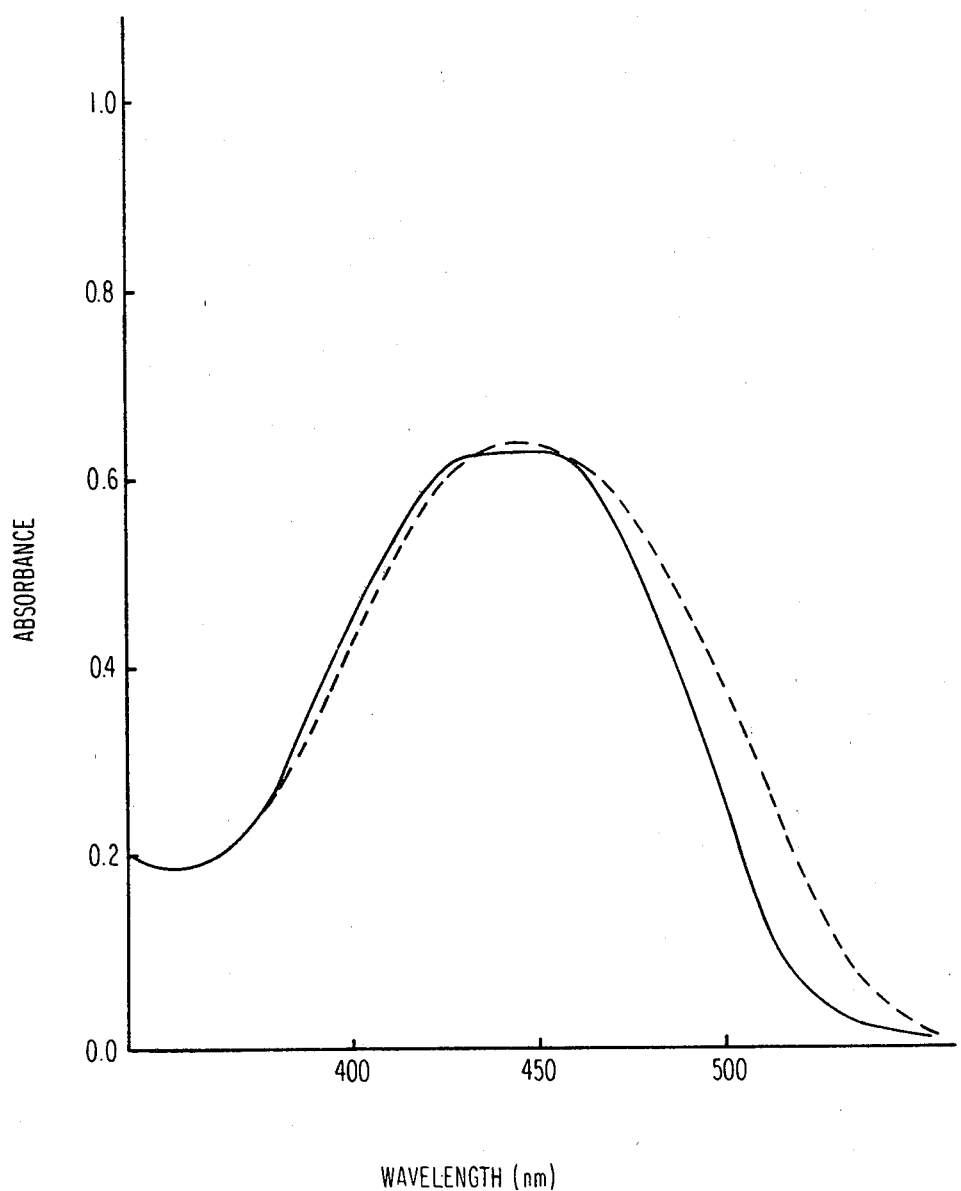

Dye Compound D released from the compound 37 described in Japanese Patent Application (OPI) No. 149328/78 (corresponding to U.S. application Ser. No. 100,076):

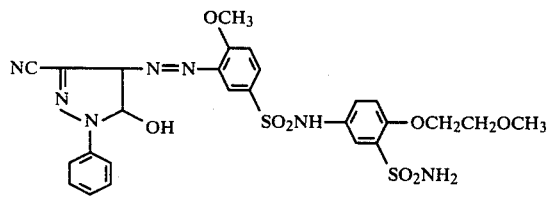

was mordanted to form mordant strips in the same manner as in Example 1, and visible light absorption was measured at each pH (FIG. 4).

As is clear from FIG. 4, in spite of the presence of the $-O-R^1-O-R^2$ within the molecule, Dye Compound D released from compound 37 described in Japanese Patent Application (OPI) No. 149328/78 (corresponding to U.S. application Ser. No. 100,076) underwent a serious change in visible light absorption with pH. The aforementioned Japanese Patent Application (OPI) No. 149328/78 does not describe that $-O-R^1-O-R^2$ depresses pH-dependence of hue and, in fact, the compounds described there do not show the effect shown in Example 1.

On the other hand, Dye Compound A released from the compound of the present invention is substantially pH-independent with respect to hue (FIG. 1). Such effect of $-O-R^1-O-R^2$ appears for the first time in the present invention and is not disclosed or taught in the literature (Japanese Patent Application (OPI) No. 149328/78 (corresponding to U.S. application Ser. No. 100,076) and Research Disclosure).

EXAMPLE 2

20 mg of Dye Compound A (as in Example 1) released from Compound 1 was dissolved in 5.0 ml of a 0.1 N sodium hydroxide aqueous solution. A mordant layer containing 3.0 g/m² of the following mordant was coated on a polyethylene terephthalate transparent support, and cut into strips to prepare mordanted strips.

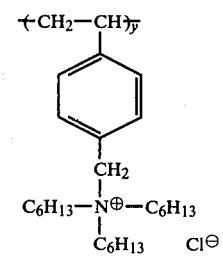

The mordant strip was dipped in the above-described solution of Dye Compound A to immobilize it so that the absorbance at maximum absorption wavelength was about 0.90. The thus mordanted strip was dipped in a buffer adjusted to 5.0 in pH, and air-dried. This sample was placed in a Pyrex tube, irradiated with a rotary irradiator (400 W high-pressure mercury lamp) to measure fading with time. Thus, half-value period of fading ($t_{\frac{1}{2}}$) was determined.

For comparison, half-value periods ($t_{\frac{1}{2}}$) of Comparative Compounds B and C (the same as in Example 1) were also determined in the same manner. The results obtained are tabulated in Table 1.

TABLE 1

| Compound | $t_{\frac{1}{2}}$ (hr) | |
|---|---|---|
| A | 32 | Invention |
| B | 28 | Comparison |
| C | 27 | Comparison |

As is clear from Table 1, it is seen that Dye Compound A released from the compound of the present invention is excellent in light fastness as compared with Comparative Compounds B and C.

As is described above, it has been demonstrated that the compound substituted with a methoxyethoxy group is a compound which does not undergo change in hue depending upon pH, and which is excellent in light fastness.

EXAMPLE 3

On a polyethylene terephthalate transparent support were coated, in sequence, the following layers to prepare a light-sensitive sheet.
(1) A mordant layer containing 3.0 g/m² of the following mordant and 3.0 g/m² of gelatin.

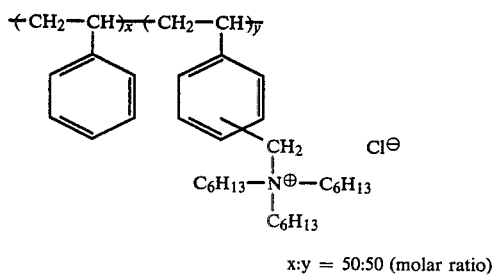

x:y = 50:50 (molar ratio)

(2) A white reflective layer containing 20 g/m² of titanium oxide and 2.0 g/m² of gelatin.

(3) A light-intercepting layer containing 2.70 g/m² of carbon black and 2.70 g/m² of gelatin.

(4) A layer containing the following cyan dye-releasing redox compound (0.50 g/m²), diethyllaurylamide (0.25 g/m²), and gelatin (1.14 g/m²).

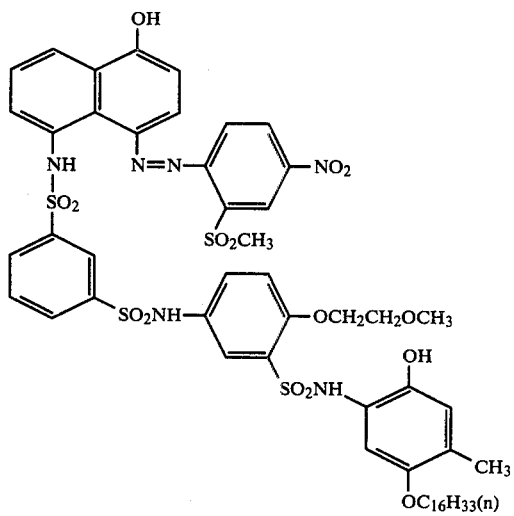

(5) A layer containing a red-sensitive internal latent image type direct reversal silver iodobromide emulsion (halide composition of the silver iodobromide: 2 mol% iodide; silver: 1.9 g/m²; gelatin: 1.4 g/m²), a fogging agent of the following structural formula (4.1 mg/mol Ag), and sodium dodecylhydroquinonesulfonate (0.13 g/m²).

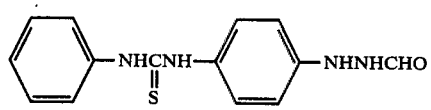

(6) A layer containing gelatin (2.6 g/m²) and 2,5-di-t-pentadecylhydroquinone (0.8 g/m²).

(7) A layer containing the following magenta dye-releasing redox compound (0.45 g/m²), diethyllaurylamide (0.10 g/m²), 2,5-di-t-butylhydroquinone (0.0074 g/m²), and gelatin (0.76 g/m²).

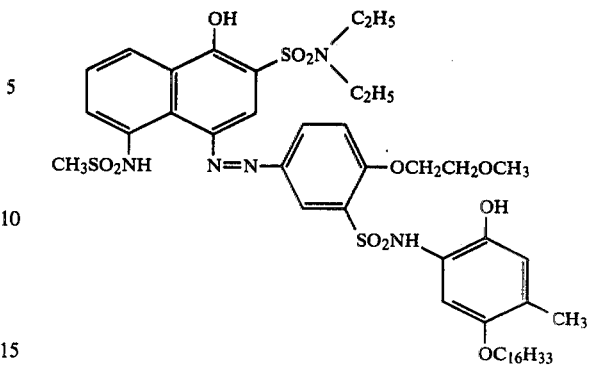

(8) A layer containing a green-sensitive internal latent image type direct reversal silver iodobromide emulsion (silver halide composition of silver iodobromide: 2 mol% iodide; silver: 1.4 g/m²; gelatin: 1.0 g/m²), the same fogging agent as used in layer (5) (3.1 mg/mol Ag), and sodium dodecylhydroquinonesulfonate (0.11 g/m²).

(9) A layer containing gelatin (2.6 g/m²), and 2,5-di-t-pentadecylhydroquinone (0.8 g/m²).

(10) A layer containing Compound 1 of the present invention (0.80 g/m²), diethyllaurylamide (0.16 g/m²), 2,5-di-t-butylhydroquinone (0.012 g/m²), and gelatin (0.78 g/m²).

(11). A layer containing a blue-sensitive internal latent image type direct reversal silver iodobromide emulsion (halide composition of silver iodobromide: 2 mol% iodide; silver: 2.2 g/m²; gelatin: 1.7 g/m²), the same fogging agent as used in layer (5) (2.6 mg/mol Ag), and sodium dodecylhydroquinonesulfonate (0.094 g/m²).

(12) A layer containing gelatin (0.94 g/m²).

This light-sensitive sheet was properly cut into pieces, and the resulting small piece was loaded in a camera. After photographing, the following cover sheet was superposed on the light-sensitive sheet, and the following processing solution was spread therebetween in a thickness of 85μ. Additionally, the solution was spread with the aid of pressure-applying rollers at 25° C. As a result, there was obtained a beautiful natural color transferred image of which yellow color showed particularly good light fastness.

Processing Solution

1-Phenyl-4-methyl-4-hydroxymethyl-3-pyrazolidinone: 10 g
Methylhydroquinone: 0.18 g
5-Methylbenzotriazole: 4.0 g
Sodium Sulfite (anhydrous): 1.0 g
Carboxymethyl Cellulose Na Salt: 40.0 g
Carbon Black: 150 g
Potassium Hydroxide (28% aq. soln.): 200 cc
H₂O: 550 cc 0.8 g of the processing solution having the above-described composition was placed in a pressure-rupturable container.

Cover Sheet

Polyacrylic acid (viscosity as a 10 wt% aqueous solution: about 1,000 cp) was coated as an acidic polymer layer (neutralizing layer) in an amount of 15 g/m² on a polyethylene terephthalate support, and 3.8 g/m² of acetyl cellulose (capable of producing 39.4 g of acetyl group by hydrolyzing 100 g of acetyl cellulose) and 0.2 g/m² of a styrene-maleic acid anhydride copolymer (composition ratio: styrene/maleic anhydride=about 60/40; molecular weight: about 50,000) were coated thereon as a timing layer to prepare a cover sheet.

While the invention has been described in detail and with reference to specific embodiments thereof, it will be apparent to one skilled in the art that various changes and modifications can be made therein without departing from the spirit and scope thereof.

What is claimed is:

1. A photographic light-sensitive sheet containing at least one light-sensitive silver halide emulsion layer, with at least one of said emulsion layers being associated with a compound represented by the following general formula (I) or (II):

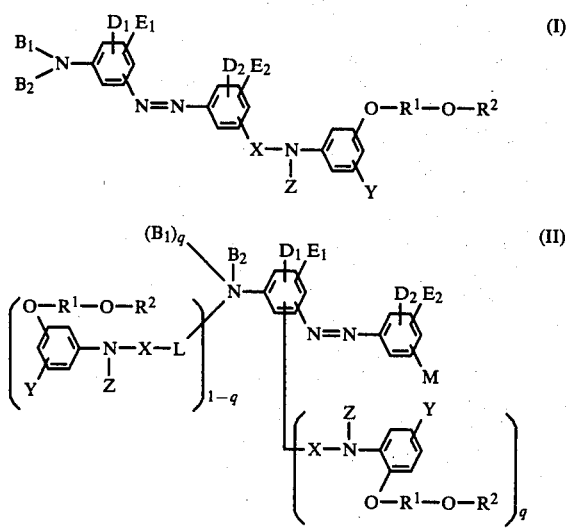

wherein $B_1$ represents a hydrogen atom, an alkyl group, a substituted alkyl group, an aryl group, a substituted aryl group, an aralkyl group, or a substituted aralkyl group, $B_2$ represents a hydrogen atom, an alkyl group, a substituted alkyl group, an aryl group, a substituted aryl group, an aralkyl group, a substituted aralkyl group, an acyl group represented by —COR³ (wherein R³ represents an alkyl group, a substituted alkyl group, an aralkyl group, a substituted aralkyl group, an aryl group, or a substituted aryl group), an alkylsulfonyl group, a substituted alkylsulfonyl group, an arylsulfonyl group, or a substituted arylsulfonyl group; $D_1$ and $D_2$ may be the same or different and each represents a hydrogen atom, an alkyl group, a substituted alkyl group, an alkoxy group, a substituted alkoxy group, or a halogen atom provided that $D_2$ does not represent an alkoxy-substituted alkoxy group; $E_1$ and $E_2$ may be the same or different and each represents a hydrogen atom, a trifluoromethyl group, a cyano group, a carboxylic acid ester group represented by —COOR³, a nitro group, a halogen atom, an alkyl group, a substituted alkyl group, an alkoxy group, a substituted alkoxy group, an alkylsulfonyl group, a substituted alkylsulfonyl group, an arylsulfonyl group, a substituted arylsulfonyl group, an alkylcarbonyl group, a substituted alkylcarbonyl group, a sulfonamido group represented by —NHSO₂R³, a carbonamido group represented by —NHCOR³, a sulfamoyl group represented by —SO₂NR⁴R⁵ (wherein R⁴ represents a hydrogen atom, an alkyl group or a substituted alkyl group, R⁵ represents a hydrogen atom, an alkyl group, a substituted alkyl group, an aralkyl group, a substituted aralkyl group, an aryl group, or a substituted aryl group, or R⁴ and R⁵ may combine directly or through an oxygen atom to form a ring), or a carbamoyl group represented by —CONR⁴R⁵, provided that $E_2$ does not represent an alkoxy-substituted alkoxy group; $R^1$ represents an alkylene group containing two or more carbon atoms; $R^2$ represents an alkyl group or a substituted alkyl group; Z represents a hydrogen atom, an alkyl group or a substituted alkyl group; X represents a divalent linking group of the formula $-(-T-A-)_n(-J-)_p$ wherein J represents a divalent group selected from a sulfonyl group and a carbonyl group, A represents an alkylene group, an aralkylene group or an arylene group, T represents a divalent oxy group, carbonyl group, carboxyamido group, carbamoyl group, sulfonamido group, sulfamoyl group, sulfinyl group, or sulfonyl group; and n and p each represents 0 or 1; L represents an alkylene group or an arylene group; M represents a hydrogen atom, an alkyl group, a substituted alkyl group, an alkoxy group, a substituted alkoxy group, a halogen atom, a sulfamoyl group of the formula —SO₂NR⁴R⁵, or a carbamoyl group of the formula —CONR⁴R⁵; q represents 1 or 0; and Y represents a diffusibility-controlling moiety.

2. The photographic light-sensitive sheet of claim 1, wherein $R^1$ represents a straight chain alkylene group having 2 to 4 carbon atoms or a branched chain alkylene group having 3 or 4 carbon atoms.

3. The photographic light-sensitive sheet of claim 1, wherein $R^1$ represents a dimethylene group.

4. The photographic light-sensitive sheet of claim 1, wherein $R^2$ represents a straight chain or branched chain alkyl group having 1 to 8 carbon atoms.

5. The photographic light-sensitive sheet of claim 1, wherein $R^2$ represents a straight chain or branched chain alkyl group having 1 to 4 carbon atoms.

6. The photographic light-sensitive sheet of claim 1, wherein $R^2$ represents an alkyl group having 1 to 8 carbon atoms in the alkyl moiety substituted with an alkoxy group or a dialkylamino group.

7. The photographic light-sensitive sheet of claim 1, wherein $B_1$ and $B_2$ may be the same or different and represent a straight chain or branched chain alkyl group having 1 to 4 carbon atoms, a straight chain or branched chain alkyl group having 1 to 4 carbon atoms in the alkyl moiety substituted with a cyano group, an alkoxy group, a phenyl group, a substituted phenyl group, a halogen atom, a sulfamoyl group of the formula —SO₂NR⁴R⁵, a carbamoyl group of the formula —CONR⁴R⁵, a sulfonamido group of the formula —NHSO₂R³ or a carbonamido group of the formula —NHCOR³.

8. The photographic light-sensitive sheet of claim 1, wherein $B_1$ and $B_2$ represent a phenyl group, a naphthyl group, a benzyl group, or a phenethyl group which may be substituted by an alkyl group, an alkoxy group, a hydroxy group, a halogen atom, a nitro group, a carboxy group, a sulfo group, a sulfamoyl group of the formula —SO₂NR⁴R⁵, a carbamoyl group of the formula —CONR⁴R⁵, a sulfonamido group of the formula —NHSO₂R³, or a carbonamido group of the formula —NHCOR³.

9. The photographic light-sensitive sheet of claim 1, wherein $R^4$ represents a hydrogen atom and $R^5$ represents a hydrogen atom or an alkyl group having 1 to 4 carbon atoms.

10. The photographic light-sensitive sheet of claim 1, wherein $D_1$ and $D_2$ represent a hydrogen atom, a straight chain or branched chain, substituted or unsubstituted alkyl group having 1 to 4 carbon atoms, a substituted or unsubstituted alkoxy group having 1 to 4 carbon atoms, or a halogen atom.

11. The photographic light-sensitive sheet of claim 1, wherein $E_1$ and $E_2$ may be the same or different and each represents a hydrogen atom, a trifluoromethyl group, a cyano group, a carboxylic acid ester group of the formula —$COOR_3$, where $R_3$ is the same as in claim 1, a nitro group, a halogen atom, a substituted or unsubstituted alkyl group having 1 to 4 carbon atoms, a substituted or unsubstituted alkoxy group having 1 to 4 carbon atoms, a substituted or unsubstituted alkylsulfonyl group having 1 to 4 carbon atoms in the alkyl moiety, a substituted or unsubstituted arylsulfonyl group, a substituted or unsubstituted alkyl carbonyl group, a sulfonamido group of the formula —$NHSO_2R^3$, a carbonamido group of the formula —$NHCOR^3$, a sulfamoyl group of the formula —$SO_2NR^4R^5$ or a carbamoyl group of the formula —$CONR^4R^5$ wherein $R^3$, $R^4$ and $R^5$ are the same as defined in claim 1.

12. The photographic light-sensitive sheet of claim 1, wherein the halogen atom represented by $D_1$, $D_2$, $E_1$, $E_2$ or M is a chlorine atom.

13. The photographic light-sensitive sheet of claim 1, wherein Z is a hydrogen atom.

14. The photographic light-sensitive sheet of claim 1, wherein X represents —$SO_2$— or —CO—.

15. The photographic light-sensitive sheet of claim 1, wherein X represents —T—$C_6H_4$—J—, —T—arylene—J—, —T—alkylene—J—, —$SO_2$— or —CO—, wherein T represents a divalent carboxyamido group, carbamoyl group, sulfonamido group, or sulfamoyl group, and J represents a sulfonyl group or a carbonyl group.

16. The photographic light-sensitive sheet of claim 1, wherein said emulsion layer is associated with a compound of the formula (I).

17. The photographic light-sensitive sheet of claim 1, wherein said emulsion layer is associated with a compound of the formula (II).

18. The photographic light-sensitive sheet of claim 17, wherein in formula (II), q, n and p are 0.

19. The photographic light-sensitive sheet of claim 1, wherein said compounds of the formulae (I) and (II) are dye-releasing redox compounds.

20. The photographic light-sensitive sheet of claim 1, wherein said compounds of the formulae (I) and (II) are dye developers.

21. The photographic light-sensitive sheet of claim 1, wherein said compounds of the formulae (I) and (II) are compounds which release a diffusible dye through self-ring closure.

22. The photographic light-sensitive sheet of claim 1, wherein said compounds of the formulae (I) and (II) are dye-releasing couplers.

23. The photographic light-sensitive sheet of claim 1, wherein Y represents an N-substituted sulfamoyl group.

24. The photographic light-sensitive sheet of claim 23, wherein Y represents an o- or p-sulfonamidophenol or an o- or p-sulfonamidonaphthol group.

25. The photographic light-sensitive sheet of claim 1, wherein:
$R^1$ represents —$CH_2CH_2$—,
$R^2$ represents a straight or branched chain alkyl group having 1 to 4 carbon atoms,
$B_1$ and $B_2$ may be the same or different and each represents a straight or branched alkyl group having 1 to 4 carbon atoms which may be substituted by a cyano group, an alkoxy group, a hydroxy group, a carboxy group, a sulfo group, a halogen atom, a sulfamoyl group, a carbamoyl group, a sulfonamido group, or a carbonamido group,
$D_1$ and $D_2$ may be the same or different and each represents a hydrogen atom, a straight or branched chain alkyl group containing 1 to 4 carbon atoms, a substituted or unsubstituted alkoxy group having 1 to 4 carbon atoms in the alkyl moiety thereof, or a halogen atom,
$E_1$ and $E_2$ may be the same or different and each represents a hydrogen atom, a trifluoromethyl group, a straight or branched chain alkyl group containing 1 to 4 carbon atoms, a nitro group, a halogen atom, a sulfamoyl group of the formula —$SO_2NR^4R^5$, or a carbamoyl group of the formula —$CONR^4R^5$ wherein $R^4$ and $R^5$ are the same as defined in claim 1,
X represents —T—$C_6H_4$—J—, —T—arylene—J— or —T—alkylene—J—, —$SO_2$— or —CO— wherein T represents a divalent carboxy group, carbonamido group, sulfamoyl group, or sulfonamido group, and J represents a divalent sulfonyl or carbonyl group, and
Y represents an N-substituted sulfamoyl group.

26. The photographic light-sensitive sheet of claim 25, wherein said compound is of the formula (I).

27. The photographic light-sensitive sheet of claim 25, wherein said compound is of the formula (II).

28. The photographic light-sensitive sheet of claim 27, wherein q is 0.

29. The photographic light-sensitive sheet of claim 1, wherein $R^1$ represents —$CH_2CH_2$—,
$R^2$ represents a straight chain or branched alkyl group containing 1 to 4 carbon atoms,
$B_1$ and $B_2$ may be the same or different and each represents a straight chain or branched chain alkyl group containing 1 to 4 carbon atoms which may be substituted by a hydroxy group, a halogen atom, a sulfamoyl group, a carbamoyl group, a sulfonamido group, or a carbonamido group,
$D_1$, $D_2$, $E_1$ and $E_2$ may be the same or different and each represents a hydrogen atom, a methyl group, an ethyl group, a methoxy group, an ethoxy group, a methoxyethoxy group, or a halogen atom,
X represents —$SO_2$—,
Y represents an N-substituted sulfamoyl group.

30. The photographic light-sensitive material of claims 25, 26 or 29, wherein said N-substituted sulfamoyl group is an o- or p-sulfonamidophenol or sulfonamidonaphthol.

31. The photographic light-sensitive sheet of claim 8, wherein $B_1$ represents an alkyl group or a substituted alkyl group; $B_2$ represents an alkyl group or a substituted alkyl group; $D_1$ and $D_2$ may be the same or different and each represents a hydrogen atom or an alkyl group; $E_1$ and $E_2$ may be the same or different and each represents a hydrogen atom, an alkyl group, a sulfonamido group represented by —$NHSO_2R^3$, a carbonamido group represented by —$NHCOR^3$, wherein $R^3$ represents an alkyl group, a substituted alkyl group, an aralkyl group, a substituted aralkyl group, an aryl group, or a substituted aryl group.

32. The photographic light-sensitive sheet of claim 31, wherein $B_1$ represents an alkyl group containing 1 to 4 carbon atoms and $B_2$ represents an alkyl group containing 1 to 4 carbon atoms.

33. The photographic light-sensitive sheet of claim 32, wherein $B_1$ and $B_2$ each represents an ethyl group; $D_1$, $D_2$, $E_1$, $E_2$ and Z each represents a hydrogen atom and X represents $-SO_2-$.

34. The photographic light-sensitive sheet of claim 1, 11, or 25, wherein $R^3$ represents a substituted or unsubstituted alkyl group having 1 to 4 carbon atoms in the alkyl moiety or a substituted or unsubstituted phenyl group having 6 to 9 carbon atoms.

35. The photographic light-sensitive sheet of claim 1, 11, or 25, wherein $R^4$ represents a hydrogen atom or an alkyl group having 1 to 8 carbon atoms in the alkyl moiety which may be substituted or unsubstituted, and $R^5$ represents a hydrogen atom, an alkyl group having 1 to 8 carbon atoms in the alkyl moiety which may be substituted or unsubstituted, or a substituted or unsubstituted phenyl group, or $R^4$ and $R^5$ may combine directly or through an oxygen atom to form a 5- or 6-membered saturated ring.

* * * * *